June 11, 1940.  E. S. HINELINE  2,203,783
CAMERA TRAVERSING APPARATUS FOR PHOTOGRAPHING
NEARBY LARGE OBJECT SURFACES
Original Filed Feb. 24, 1936   16 Sheets-Sheet 1
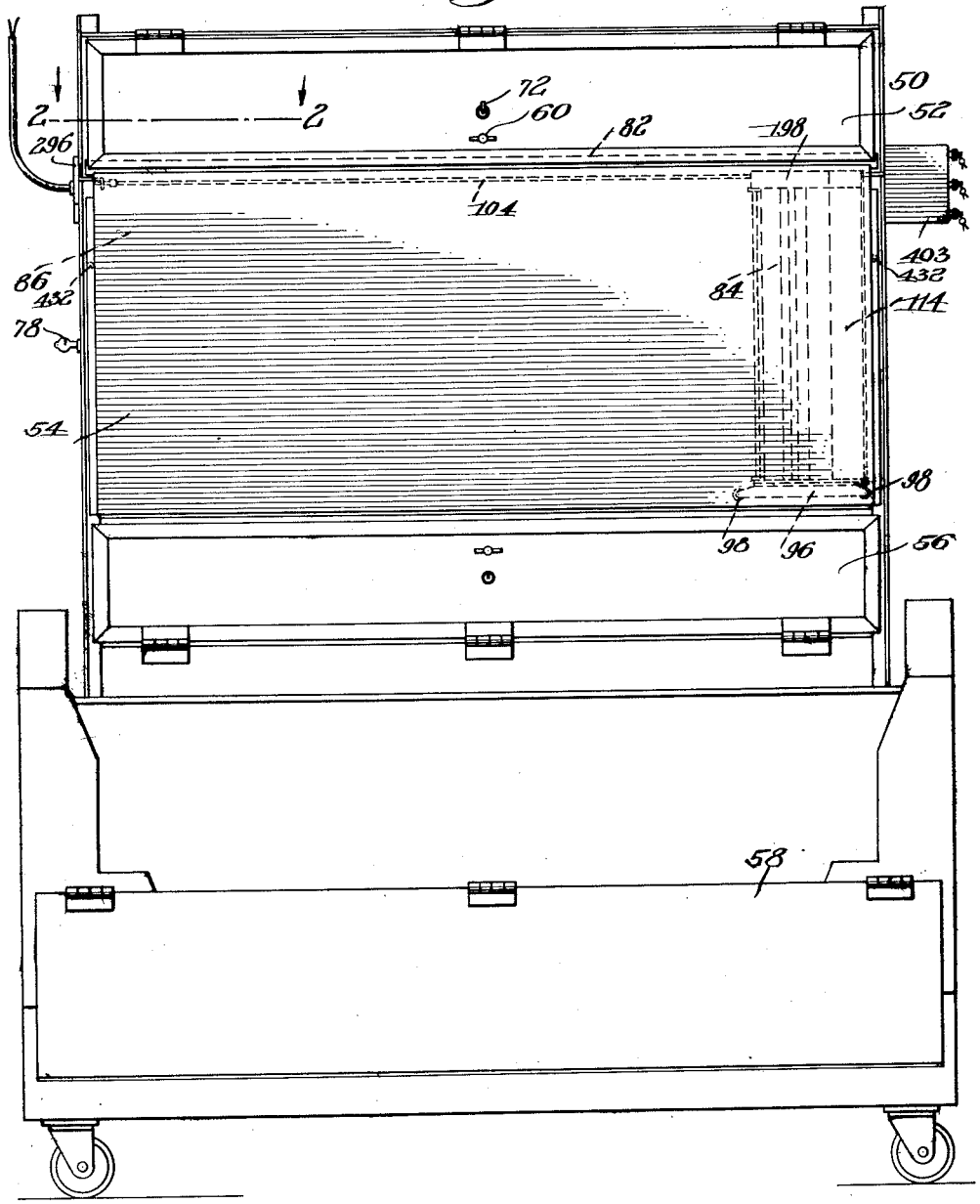
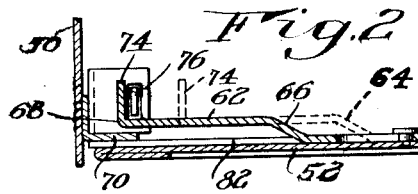
INVENTOR.
Edson S. Hineline
BY
Emery, Booth, Townsend, Miller and Neidner
his ATTORNEY.

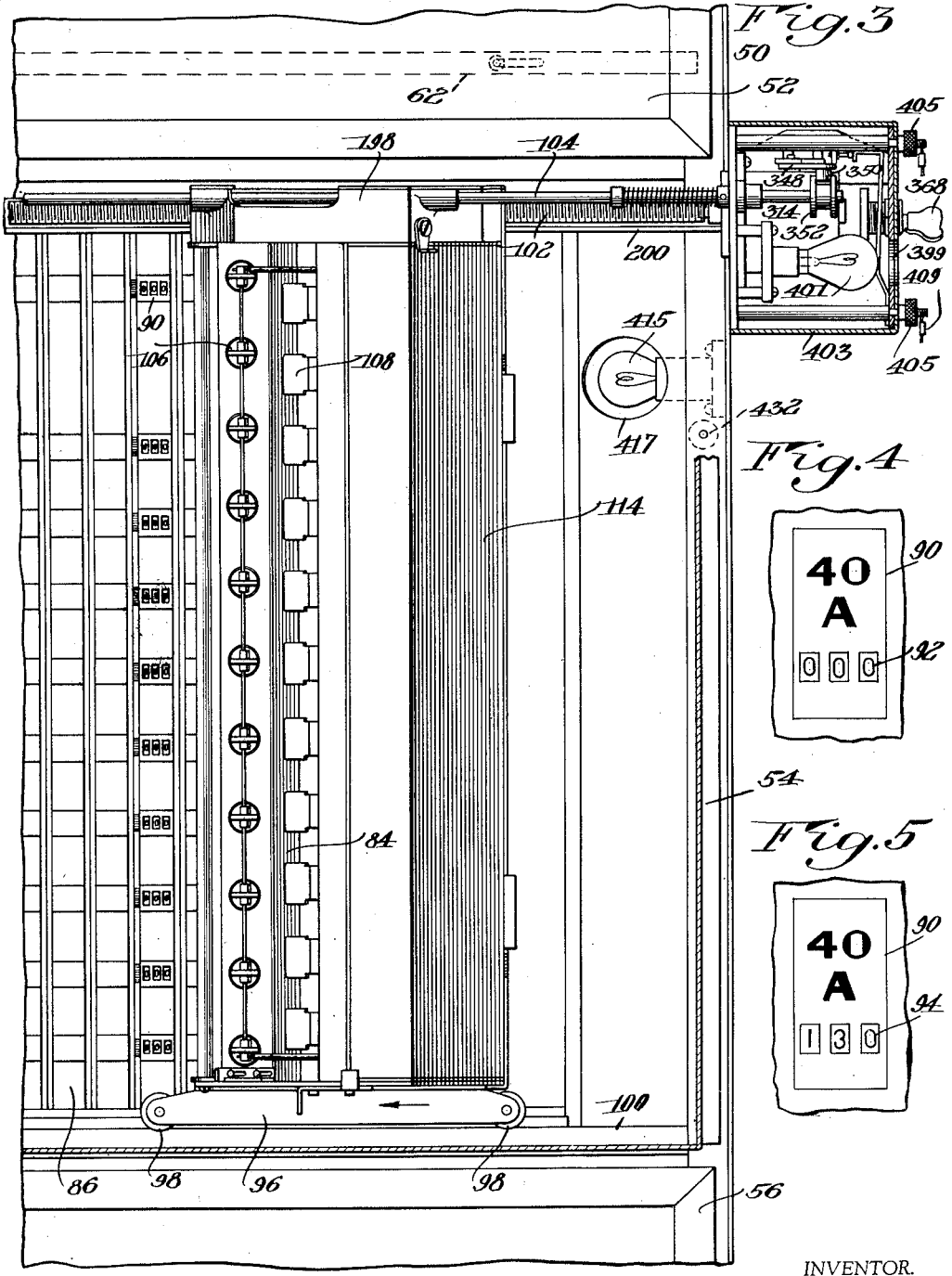

June 11, 1940.  E. S. HINELINE  2,203,783
CAMERA TRAVERSING APPARATUS FOR PHOTOGRAPHING
NEARBY LARGE OBJECT SURFACES
Original Filed Feb. 24, 1936   16 Sheets-Sheet 3

INVENTOR.
Edson S. Hineline
BY
Emery, Booth, Townsend, Winter and Heidman,
his ATTORNEY.

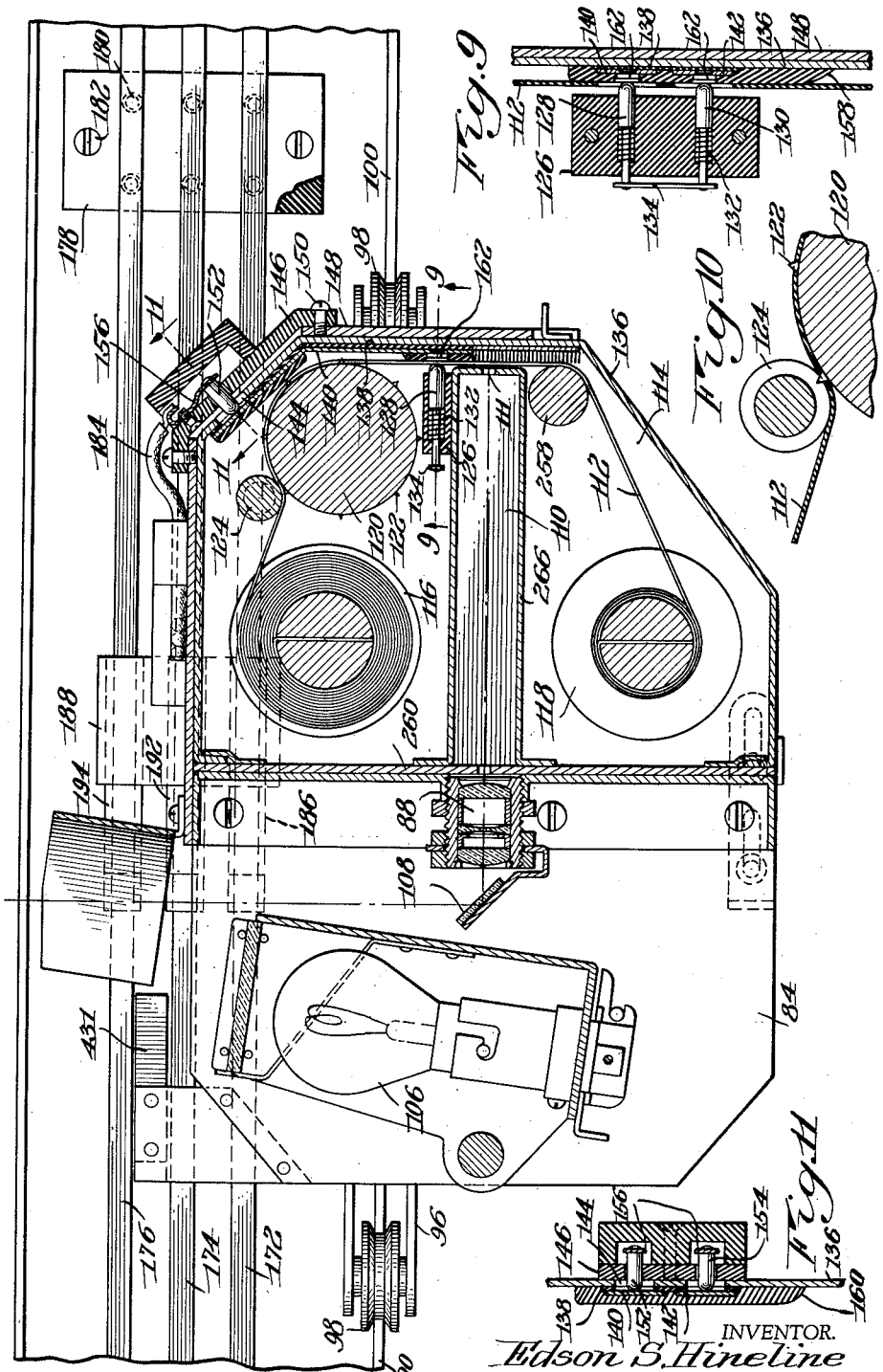

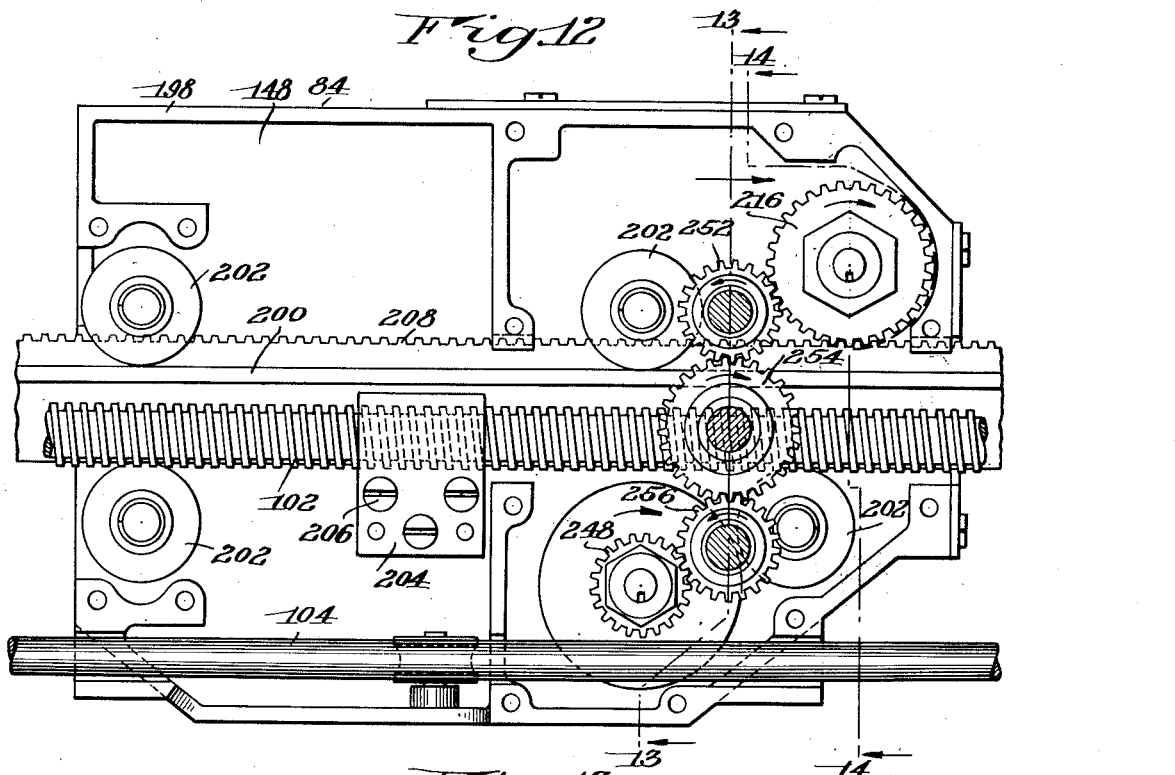
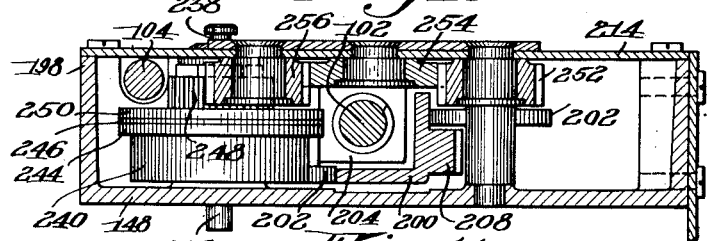
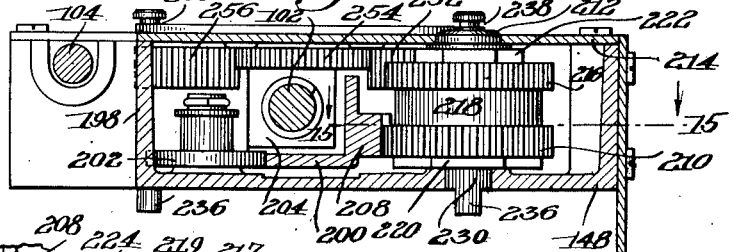
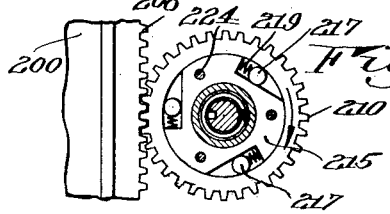

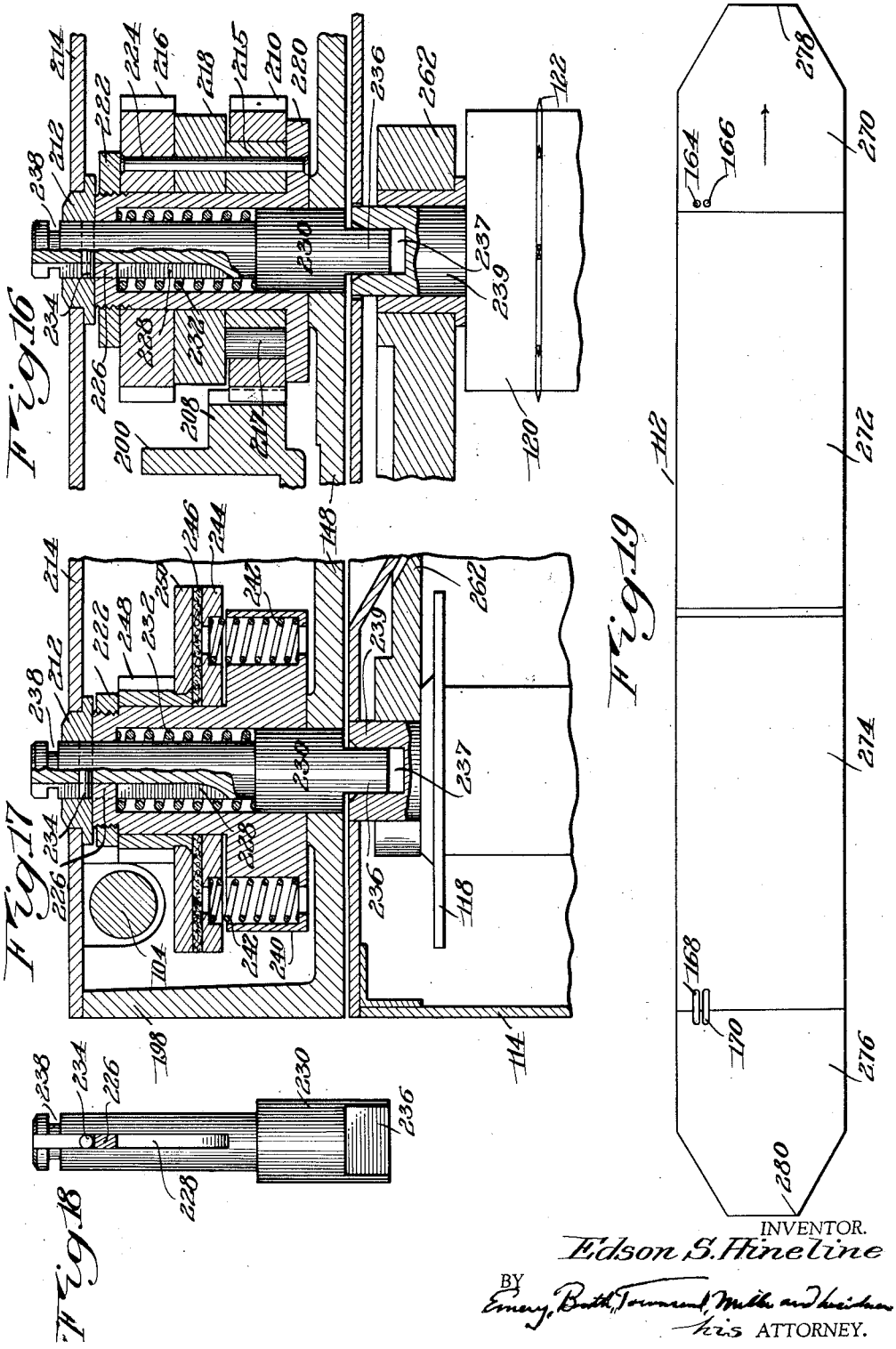

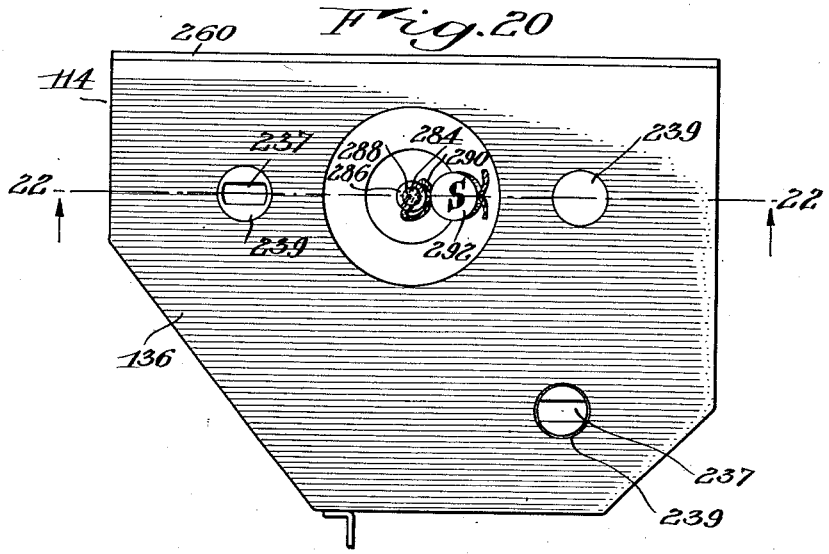
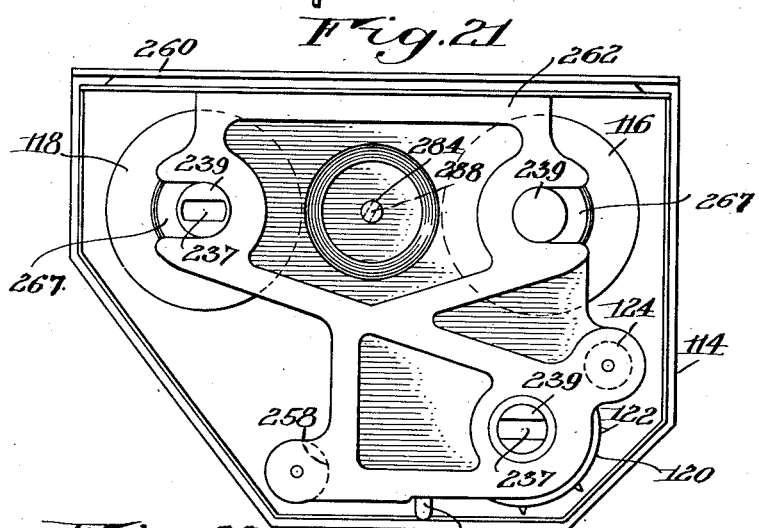
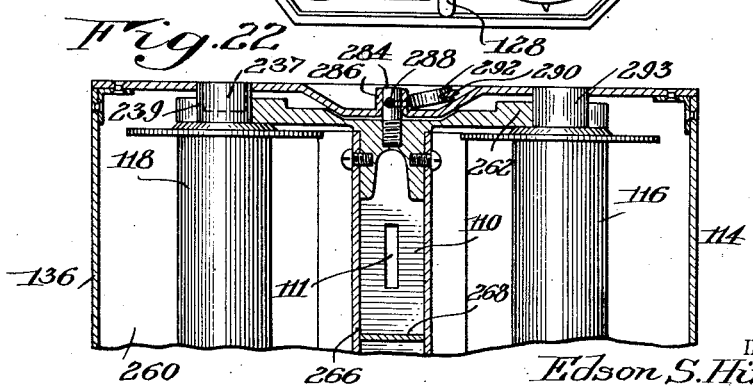

June 11, 1940.                E. S. HINELINE                2,203,783
              CAMERA TRAVERSING APPARATUS FOR PHOTOGRAPHING
                        NEARBY LARGE OBJECT SURFACES
                 Original Filed Feb. 24, 1936    16 Sheets-Sheet 8
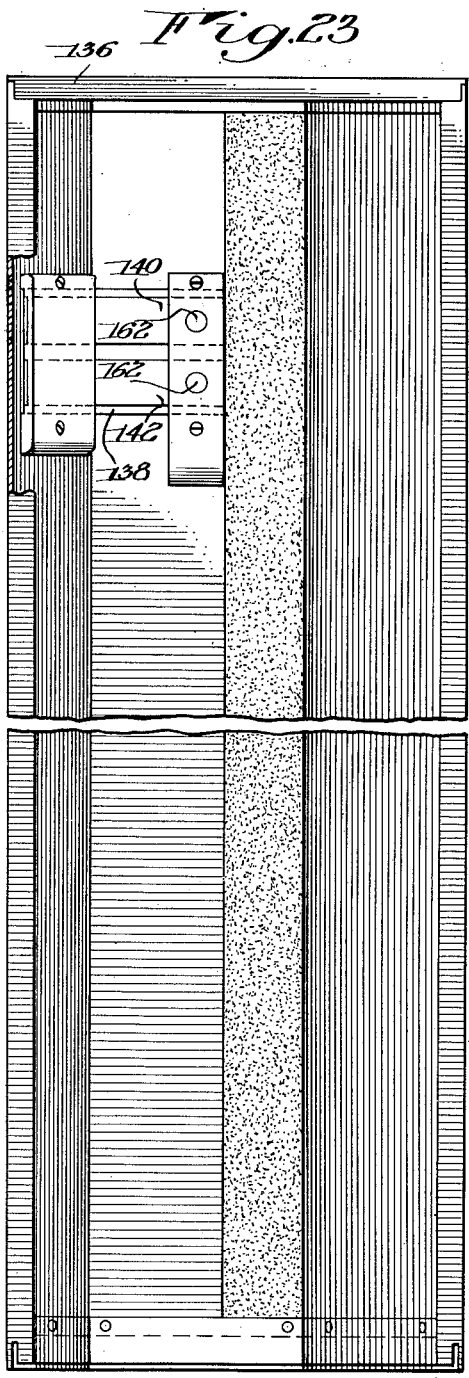
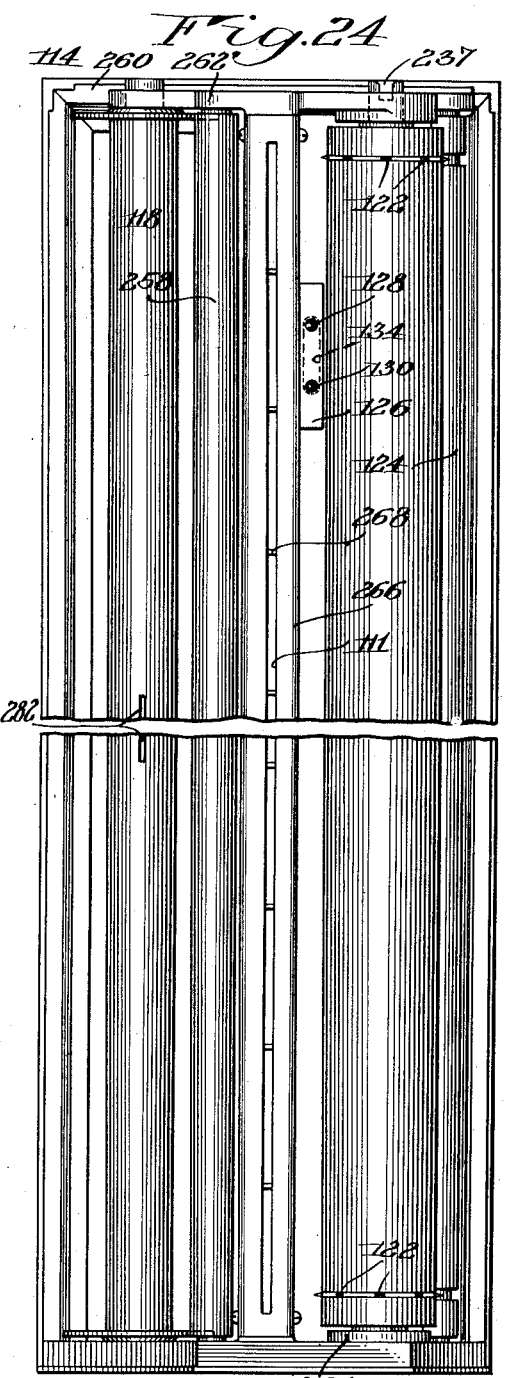

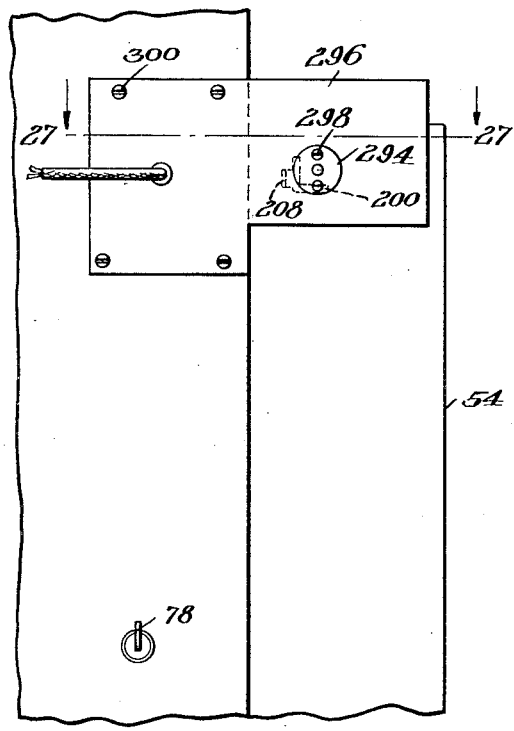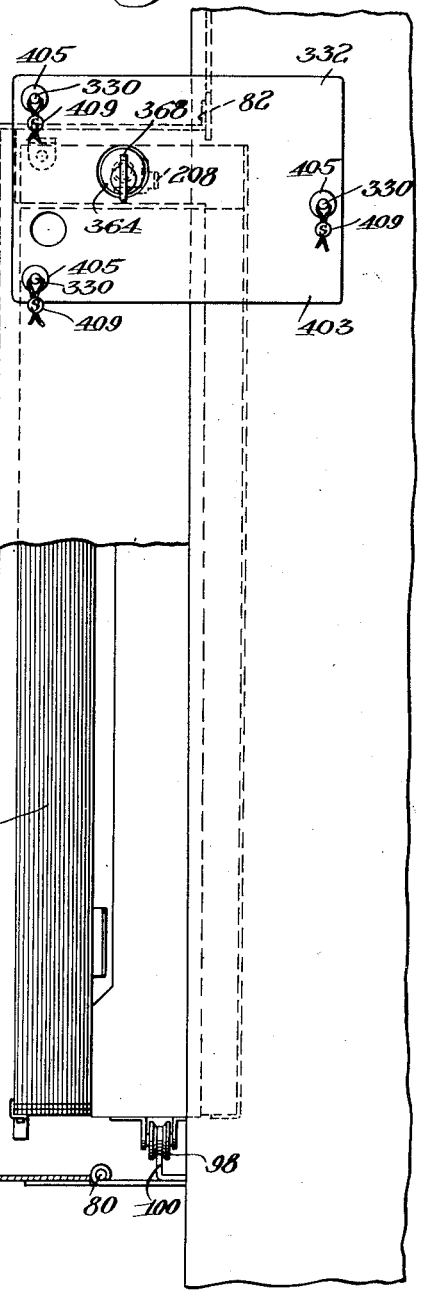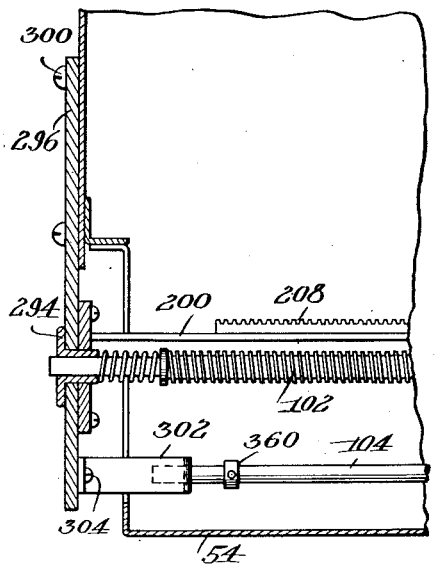

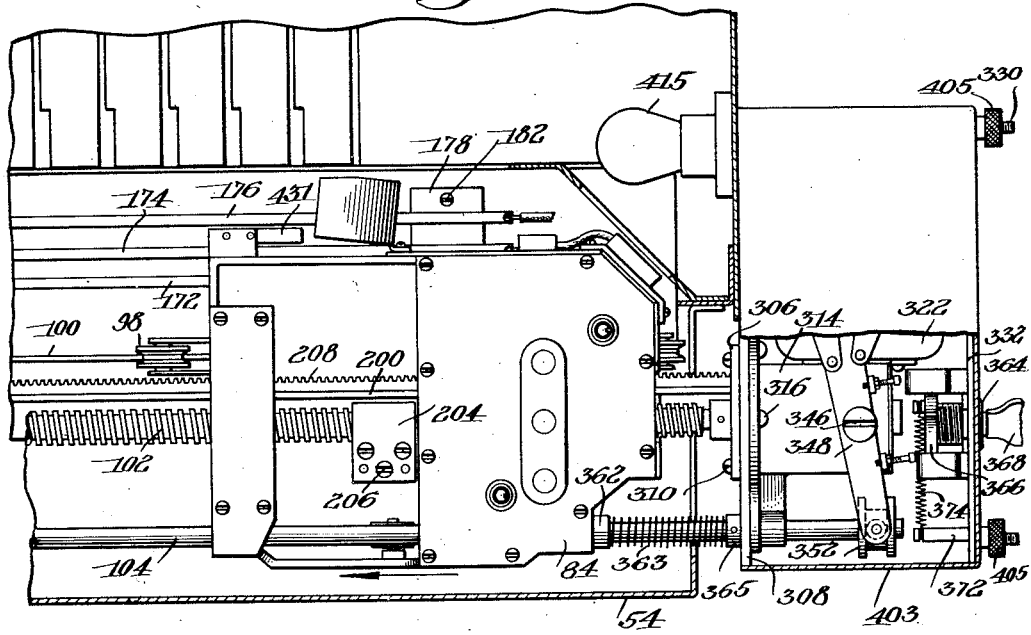
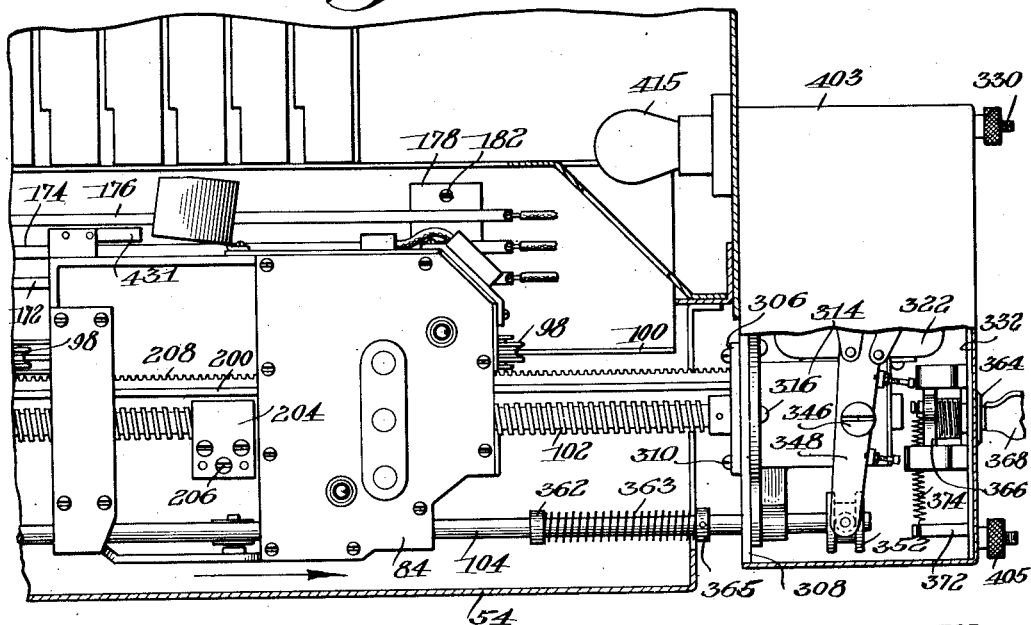

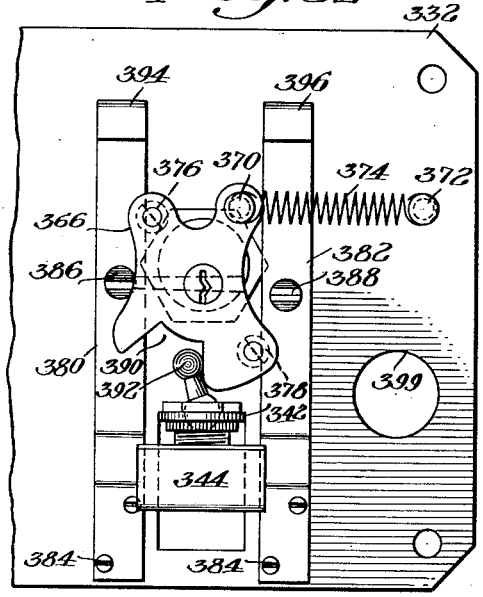
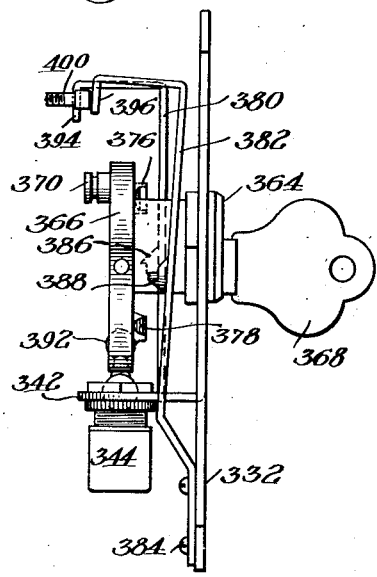
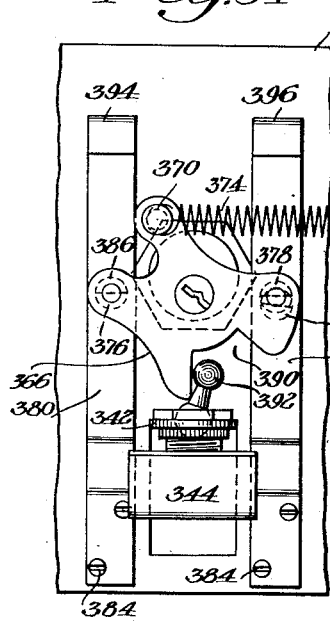
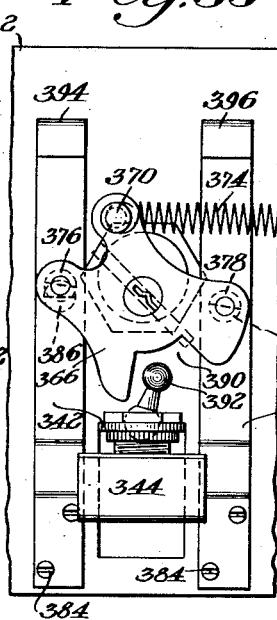
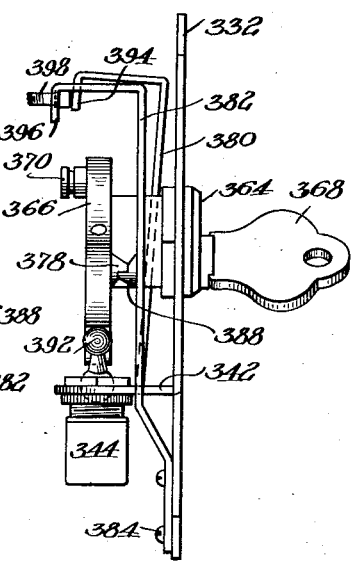

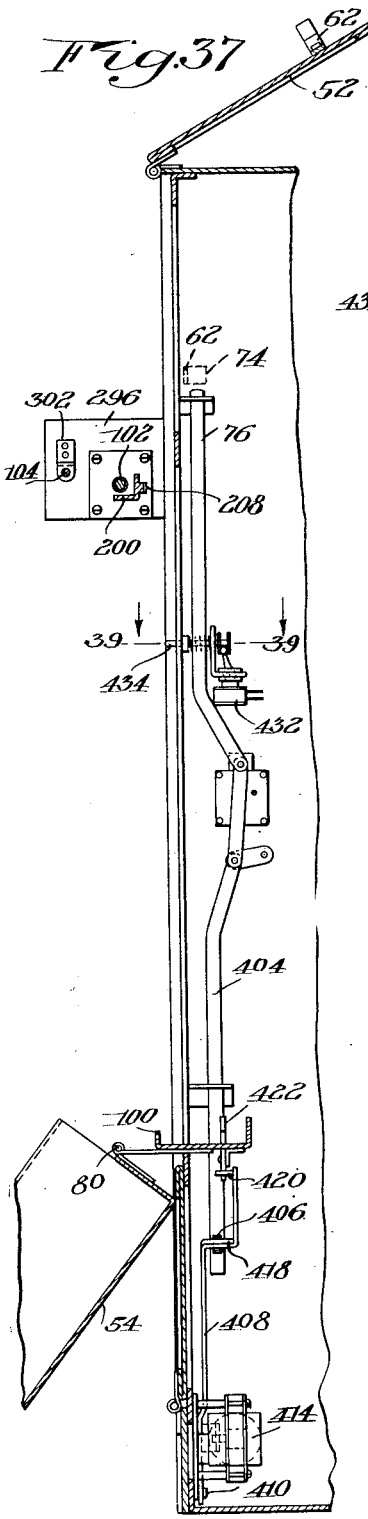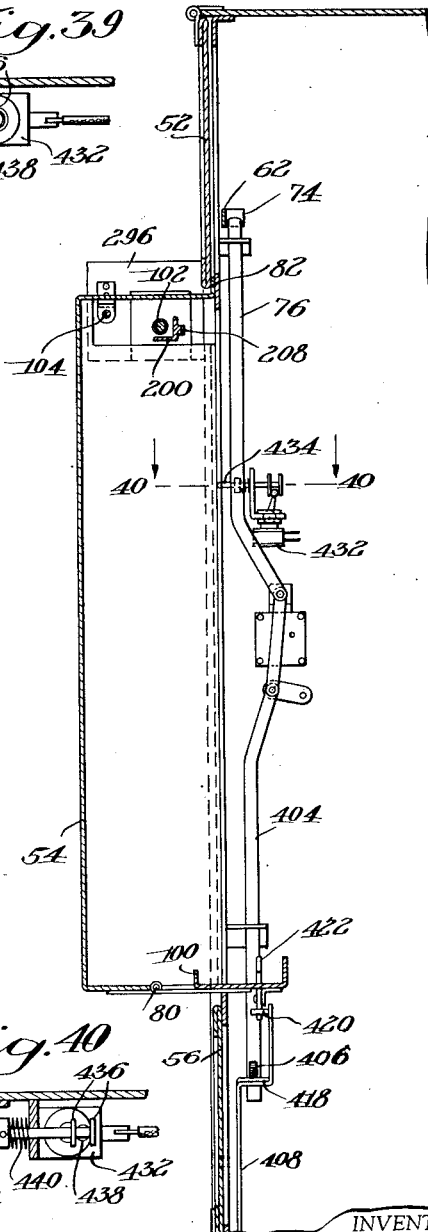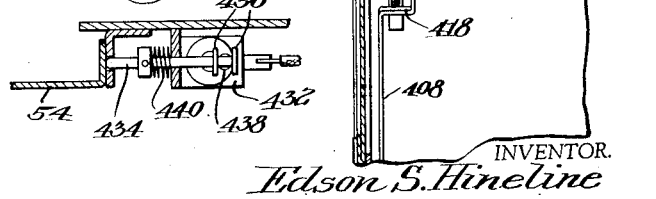

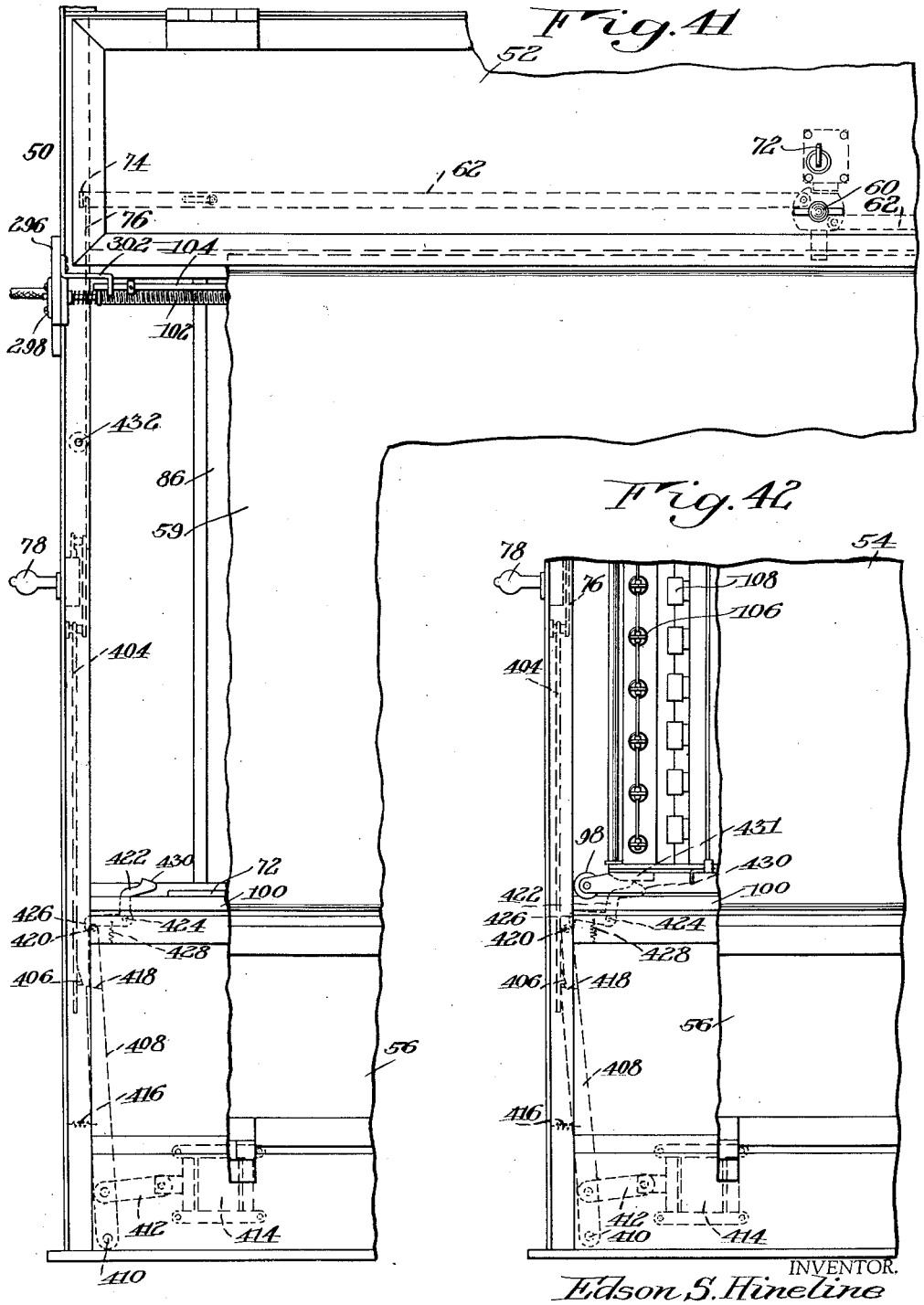

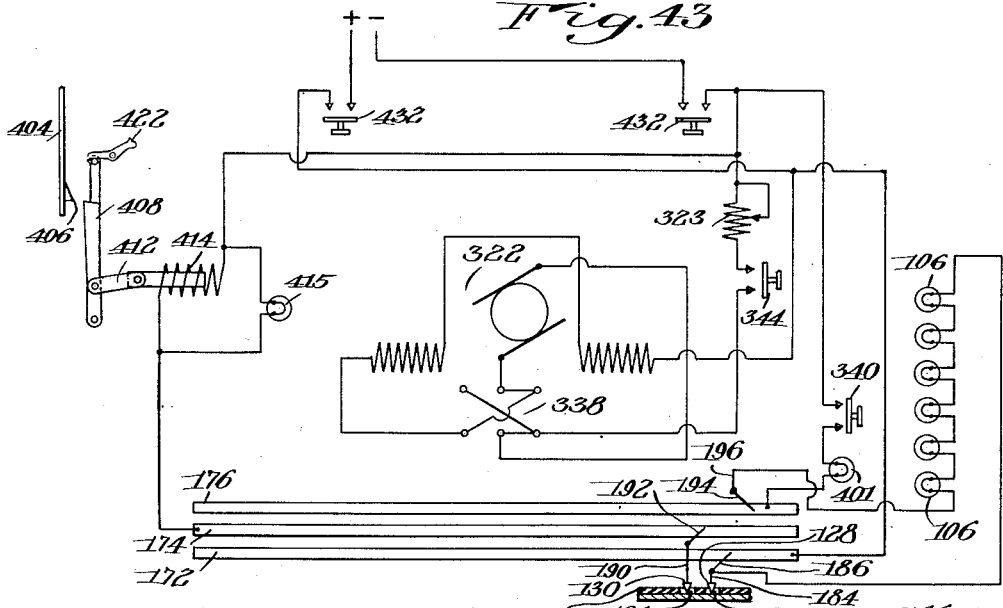
Fig. 43
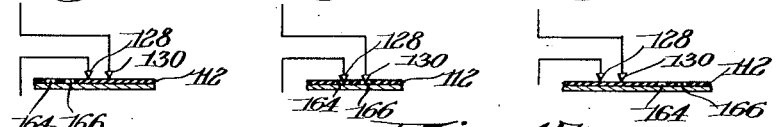
Fig. 44  Fig. 45  Fig. 46
Fig. 47
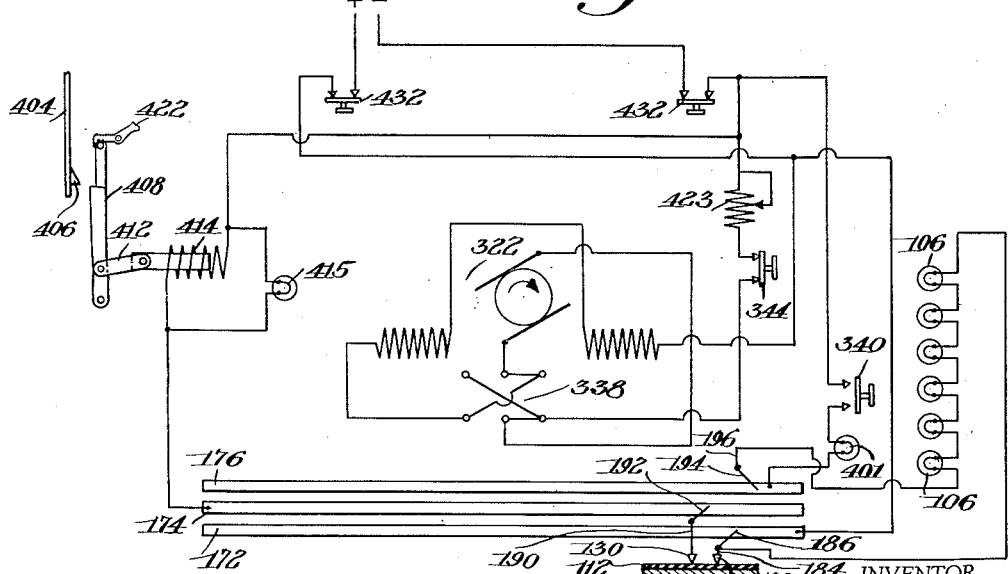
INVENTOR.
Edson S. Hineline
BY
his ATTORNEY.

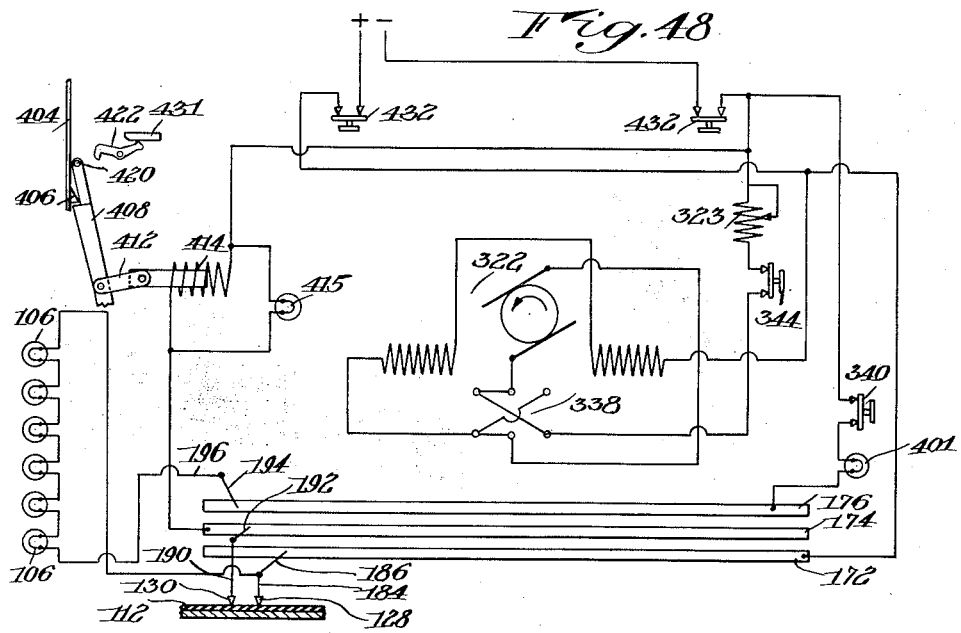

Patented June 11, 1940

2,203,783

UNITED STATES PATENT OFFICE 2,203,783

CAMERA TRAVERSING APPARATUS FOR PHOTOGRAPHING NEARBY LARGE OBJECT SURFACES

Edson S. Hineline, Rochester, N. Y., assignor to Folmer Graflex Corporation, Rochester, N. Y., a corporation of Delaware Continuation of application Serial No. 65,260, February 24, 1936. This application December 5, 1939, Serial No. 307,644

24 Claims. (Cl. 88—24)

This application is a refiling with identical disclosure of my co-pending application Ser. No. 65,260, filed February 24, 1936, for Camera traversing apparatus for photographing nearby large object surfaces, and is therefore a continuation thereof.

In my Patent No. 2,136,262, dated November 8, 1938, based upon an application constituting a continuation of the present application as to subject-matter common thereto, there is disclosed a construction very similar to, but not identical with, the construction herein shown. The claims of my said Patent No. 2,136,262 are broad and generic in scope, and I herein claim only matter not claimed in said patent, the claims herein not being directed to a voting machine, which is herein shown merely as an embodiment of mechanism for practising my invention, and which might be practised in the photographing of objects other than the counter-board of a voting machine; on the contrary, the claims herein are directed to certain mechanism for traversing a camera across an object-surface to be photographed and for returning the camera to its starting position, thereby to complete a cycle. While not directing the claims to a voting machine, I will specifically refer, for purposes of explanation of the practising of my invention, to the voting machine shown in the accompanying drawings.

A voting machine, as now constructed, comprises a relatively large board upon which are arranged, in horizontal and vertical rows, a plurality of small card holders, each adapted to contain a card bearing the name of a candidate or of an issue. A plurality of small levers, one for each card holder, are made accessible to the voter, and, by manipulation of selected levers, the voter registers his preference.

On a corresponding large board at the rear of the machine are arranged in horizontal and vertical rows a plurality of counters, one for each candidate or issue. These counters are so connected to the small levers that each time a lever is manipulated in favor of a candidate or an issue, the register of its respective counter is increased by one in numerical value.

Preferably these counters are turned to "zero" before voting is begun so that an inspection of the individual counters after voting is completed, will accurately reveal the number of votes cast for each candidate. They need not, however, be all turned to "zero" if a true record is made of the counters before and after voting, for in such a case, the numerical value of a counter before voting will be deducted from its value after voting is completed and an accurate count thus achieved.

Part of the mechanism herein disclosed comprises means of making an accurate photographic record of the counter board both before voting begins and again after it is completed. Mechanism of this character is shown and described in Patent No. 1,977,453, October 16, 1934, to William H. Petit and Edson S. Hineline. The present invention, however comprises a greatly improved mechanical structure for accomplishing this result.

Another part of the mechanism used in the herein defined structure comprises a magazine adapted to contain and seal the photographic film upon which the register of the counter board is kept, to the end that one not authorized to inspect the register, may neither remove it nor otherwise have access thereto. Mechanism of this character is shown and described in Patent No. 1,966,261, July 10, 1934, to William H. Petit and Edson S. Hineline. The mechanism herein shown to accomplish this purpose comprises greatly improved structural details.

The film strip employed in the embodiment herein shown is substantially that shown in Patent No. 1,963,096, June 19, 1934, to William H. Petit and Edson S. Hineline. This strip embodies such structural variations in its cross sectional contour as will complete an electric circuit at a predetermined position in its travel. This circuit when completed, performs, electrically, one of the functions of this invention.

By this invention, I accomplish a new result which so far as I am aware cannot be attained by the use of any known mechanism and has not heretofore been practised in any way. The present disclosure involves preventing all access to the counters of a registering or like mechanism from the commencement of the making of the first photographic record thereof (and the registering means are then manipulated as in a voting or other mechanism) unless and until a second photographic record is made of the condition of the counter board after the manipulation of the registering means is completed. The means I prefer include interlocking or interengaging means to prevent any access to the said registering means, one form or embodiment of which I will disclose without in any way limiting myself thereto. I desire it to be understood that my invention, although herein disclosed as practised upon or in connection with a voting machine, may be employed in many different types of registering or locking means. By this means the counters, the camera, and the film magazine are sealed against tampering by any person whomsoever during the period between the casting of the first and last vote.

That this new object and other meritorious features are attained will become apparent as the invention is described in detail and reference is had to the drawings wherein—

Fig. 1 is a rear view of a voting machine with the rear doors and the counter board cover closed, showing the camera in a starting position in dotted lines;

Fig. 2 is a fragmentary section taken at 2—2 of Fig. 1 showing the mechanism for interlocking the upper door and the voting release key mechanism;

Fig. 3 is a view of the rear of the voting machine with the counter board cover open and some parts of the housing cut away to show the relation of the mechanism at a given period;

Fig. 4 is an enlarged view, approximately actual size, of one of the counters set at "zero";

Fig. 5 is a similar view with the counter set at 130;

Fig. 6 is a front view of the camera, that is, the side of the camera next to the counter board;

Fig. 7 is a view of the camera, taken from the left side thereof when facing the counter board;

Fig. 8 is an enlarged section through Fig. 6 on line 8—8;

Fig. 9 is a section through Fig. 8 on line 9—9 showing a contact mechanism operated by structural variations in the film strip used in making the photographic record;

Fig. 10 is an enlarged view of a portion of Fig. 8;

Fig. 11 is a section taken through Fig. 8 on line 11—11 showing contact mechanism insulatedly supported on the camera for conveying current from the contact mechanism, Fig. 9, to the machine proper;

Fig. 12 is a top view of the camera with the cover removed showing the various relations of the driving mechanism for moving the camera across the counter board;

Fig. 13 is a section through Fig. 12 on the line 13—13;

Fig. 14 is a section taken through Fig. 12 on line 14—14;

Fig. 15 is a partial section taken through Fig. 14 on the line 15—15;

Fig. 16 is a section through the over-running clutch showing the feed roller drive;

Fig. 17 is a section through the take-up clutch showing the spool drive;

Fig. 18 is one of the film driving shafts shown removed from the magazine;

Fig. 19 is a plan view of the film strip showing the cut-out portions adapted for circuit control, the leader strip, a first and second sensitized portions and the trailer strip, the two lines in the center merely indicating a division between that part of the record taken before and that part taken after voting;

Fig. 20 is a top plan view of the magazine showing the manner of sealing;

Fig. 21 is a top view of the magazine with the cover removed showing the spools in place;

Fig. 22 is a partial section through Fig. 20 on the line 22—22;

Fig. 23 shows the magazine cover only, as it appears when removed from the magazine proper;

Fig. 24 is a view of the magazine with the cover, Fig. 23, removed, showing the feed roll, the film spool and the exposure opening;

Fig. 25 is a partial end view of the voting machine showing the voting release key and the camera left end supporting plate;

Fig. 26 is a partial right hand end view of the voting machine showing the camera starting switch and the control box with a section of the door cut out to show the position of the camera;

Fig. 27 is a section taken through Fig. 25 on line 27—27;

Fig. 28 is a top elevation with part of the switch cover broken away to show one of the positions of the switch lever, as when the camera is traveling in the direction of the arrow shown;

Fig. 29 is a like view showing a different position of the switch lever with the camera traveling in the reverse direction;

Fig. 32 is a view showing the switch key control for starting the camera traverse mechanism;

Fig. 33 is an end view of Fig. 32;

Fig. 34 is a view similar to Fig. 32 except that the switch is in a different position;

Fig. 35 is a similar view to Fig. 32 with the switch in still a different position;

Fig. 36 is an end view of Fig. 35;

Fig. 37 is a section through the voting machine showing the arrangement of the parts for the interlocking means with the upper voting machine door open;

Fig. 38 is a similar view with the upper voting machine door closed;

Fig. 39 is a section through Fig. 37 on the line 39—39, showing the position of a circuit breaking switch when the door is open;

Fig. 40 is a section through Fig. 38 on line 40—40 showing the position of the circuit breaking switch when the door is closed;

Fig. 41 is a rear view of the voting machine showing various parts of the interlocking mechanism in dotted lines when the camera (not shown) is in the starting position;

Fig. 42 is a similar view with the camera in its complete left end position that is, at the point at which its motion is reversed;

Fig. 43 is a diagram of the electrical circuit through the mechanism when the camera is in the starting position with the door open, the magazine in place and the film strip made ready for the first exposure;

Fig. 44 is a portion of the circuit diagram showing the position of the film strip under the electrical contacts when the magazine is placed in the camera;

Fig. 45 is a portion of the circuit diagram showing the position of the contacts in relation to the film strip when it has been wound to a signaling position;

Fig. 46 is a similar view showing the position of the contacts in relation to the film strip when it has been wound to its starting position;

Fig. 47 is a circuit diagram with the magazine in place, the upper door and counter board cover closed, and the switch which is operated by the camera starting key in contact and the motor running in the forward direction to drive the camera across the back of the voting machine;

Fig. 48 is a circuit diagram at the time the camera reaches its extreme left hand point of travel at which position the motor is caused to reverse, whereupon it will travel in picture making direction; it also shows the illumination switch closed, the voting machine door in the closed position, and the interlocking latch tripped by the camera movement;

Fig. 49 is a circuit diagram as it will be after the camera has returned to full right hand position, the door being still closed, and the paper positioning contacts in position as in Fig. 45 causing a solenoid to be energized to withdraw an interlocking pawl. The motor switch and the light switch are both open while the door is still closed.

Figure 30:
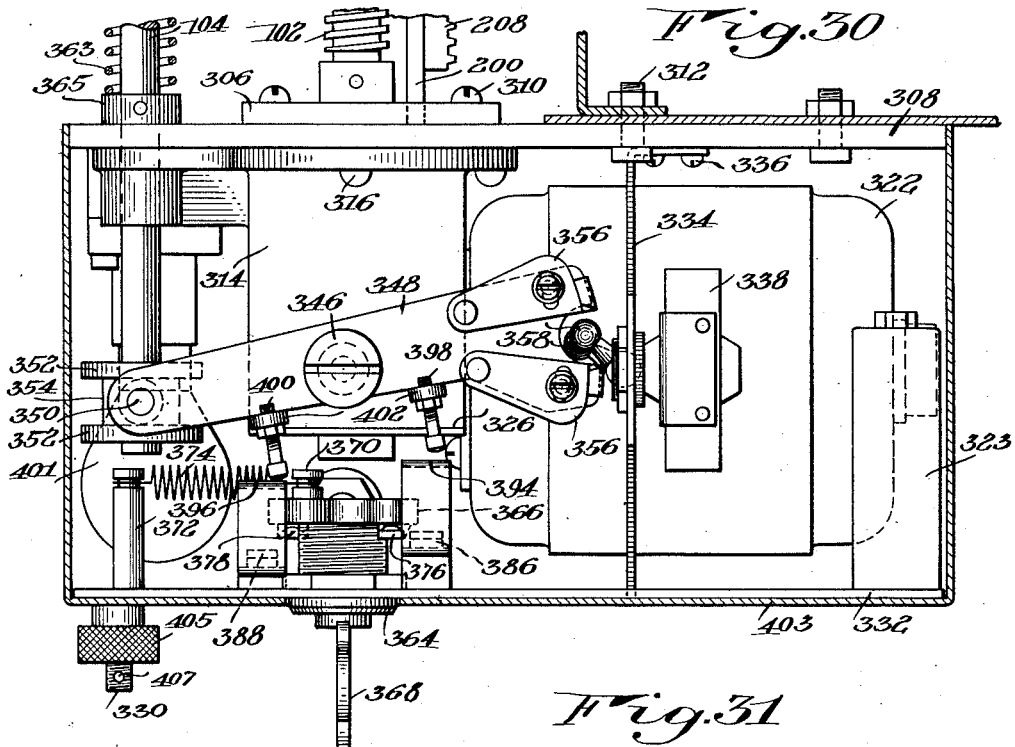
Fig. 30 is a top plan view of the camera traversing motor control and the light switching means assembly.

Inasmuch as the mechanism comprising this embodiment of the invention is positioned entirely on the rear or counter board side of the voting machine, no views of the front or voters' side of the machine are provided. In the rear elevation Fig. 1, the machine proper, generally designated by the numeral 50, has an upper door 52, a counter board cover 54, a middle door 56 and a lower door 58, all for closing the operative mechanism. The middle and lower doors, 56 and 58, have no function in connection with the counting mechanism herein defined.

The locking mechanism of the upper door 52, comprises a knob 60, the turning of which operates a bolt 62 (see Fig. 2) from the dotted position 64, to the position 66, in which the end 68, of the bolt enters behind the edge 70 of the housing to retain the door in closed position. The upper door key 72, may be turned in one or the other direction to secure the knob 60 against turning or to release it for unbolting as desired.

Projecting laterally from the bolt 62 is the interlocking end 74 in front of which a vertically operative locking bar 76, shown in elevation in Figs. 37 and 38, may be made to extend to prevent unbolting of the upper door. This locking bar 76 is operable vertically into and out of its position in front of the projection 74 by the voting release key 78. The voting release key 78, while provided primarily for unlocking the mechanism in the front of the machine and making it available to the voter, thus also serves as an interlock whereby the upper door 52 may not be unbolted after the voting mechanism is thus made available to the voter.

The counter board cover 54 is hinged at the lower edge at 80 (see Fig. 38) and its upper edge has a lip 82, which extends upward and is covered by the upper door 52 when the upper door is closed. No other means of securing the counter board cover in closed position is provided. It will be obvious that when the counter board cover 54 is closed and the upper door 52 is closed over its upper edge and bolted as shown in Fig. 1, and the voting release key is turned to make the voting mechanism available to the voter and to interlock the upper door bolt, so it may not be turned to open position, the camera 84, and the counter board 86, may not be tampered with.

Inasmuch as the disclosed mechanism includes means whereby two photographic records of the counter board are made and the total count for any candidate or issue is the difference between the numerical value of the corresponding counter as recorded on the first and second photograph, it becomes important that means be provided to prevent turning of the voting release key to lower bar 76 between the time that the camera begins to take the first photograph and the time at which it has completed the last. The combination of mechanically and electrically operative mechanism provided to attain this result will be hereinafter described.

In Fig. 3 is shown an elevation of the camera 84 and counter board 86, the traversing mechanism being in many respects similar to that shown in Patent No. 1,977,453, supra, but constituting an improvement thereon, and particularly in that the electric motor, instead of being mounted upon and traveling with the photographic apparatus, is stationarily mounted. The camera itself, more clearly shown in Figs. 6 to 8, comprises a vertical row of lenses 88, spaced and positioned to correspond to the horizontal rows of counters 90 on the counter board, whereby each lens may traverse and progressively be focused upon an entire horizontal row of counters. In the operation of the mechanism herein disclosed, but to which the invention herein claimed is not restricted, the counters are traversed twice, once when the counters have all been turned to zero position, as shown at 92, in the enlarged view, Fig. 4, and again, after voting is completed when the counters show a registration of their respective counts, as at 94, in the other enlarged view, Fig. 5.

A carriage 96 on the base of the camera carries a pair of grooved rollers 98 which support and guide the camera on its transverse movement by rolling on the track 100. The upper end of the camera is moved and controlled by a coarse pitch screw 102, which may be called the camera traversing screw, and a rod 104, which may be called the camera control rod. The manner in which this screw and rod controls transverse movement of the camera will hereinafter appear. A series of light bulbs 106 are arranged to light the counter board as they traverse it, and a corresponding series of angle mirrors 108 transfer the image of the counters being traversed through a series of lenses 88, light tunnels 110 and exposure openings 111 (see Fig. 8) to the film strip 112 within the magazine 114.

The magazine 114 contains the film strip 112, shown in detail in Fig. 19, which, before exposure, is wound on the film strip supply spool 116, and, during exposure, is transferred from the film strip supply spool 116 to the film strip take-up spool 118. A feed roll 120 is rotated during movement of the camera at such a speed as will move the film strip past the exposure openings 111, at the same rate of speed as the camera is traveling. Driving points 122, shown enlarged in Fig. 10, penetrate and engage the strip to insure that movement of the strip will be the same as the peripheral speed of the roll. A small guide roll 124 is positioned to maintain engagement of the strip with the driving points.

An insulating block 126 (see Fig. 8 and fragmentary section Fig. 9) secured to the frame of the magazine 114, contains the contact members 128 and 130, which are urged by the springs 132 toward the film strip 112, whereby the ends of the contact members are normally held against the surface of the strip. A metal bridge 134 electrically connects the contact member 128 to the contact member 130.

Insulatedly supported on the cover 136 of the magazine by the strip 138 are two electrically conductive strips 140 and 142 adapted to convey current from the contact members 128 and 130 respectively to the rear of the magazine cover. The rear ends of the strips 140 and 142 overlie openings 144 in the magazine cover 136, whereby spots on the strips are accessible for electrical connection from the exterior of the magazine when it is closed.

An insulating member 146 is secured to the camera frame 148 by the screws 150. Member 146 (see Fig. 11) carries the contact members 152 and 154 adapted to extend through the openings 144 and make contact with the strips 140 and 142 respectively. By virtue of the flexible flat conductive blades 156, the contact members are resiliently held in electrical contact with the strips. Protective insulating layers 158 and 160 (see Figs. 9 and 11) overlie the conductive strips 140 and 142 respectively, where they are proximate other metal parts within the magazine. Insulating strip 158, however, has openings 162, through which the contact members 128 and 130 may extend and electrically connect the strips 140 and 142 through the bridge 134, when the film strip 112 does not overlie the openings 162. It is obvious that properly positioned openings, such as 164, 166, 168 and 170 (see Fig. 19), in the film strip will permit the contact members 128, 130 electrically to connect the strip 140 to the strip 142, whereby electrical current may flow in through one strip and out through the other.

Below the camera near and parallel to the track 100 are three electrically conductive rails 172, 174 and 176, all secured to insulating blocks 178 by rivets 180. Blocks 178 are held to the machine proper by the screws 182. The contact member 152 is electrically connected to the rail 172 through a wire 184, which is secured to a flexible sliding brush 186 carried on an insulating block 188 on the bottom of the camera. The contact member 154 is electrically connected to the rail 174 through a wire 190 which is secured to a flexible sliding brush 192, also carried on the insulating block 188. A third flexible sliding brush 194, carried by the insulating block 188, makes electrical contact with the rail 176. A wire 196 connects the brush 194 to the brush 186 through the bank of lamps 106, which are connected in series.

On the upper surface of the camera 84 is formed a housing 198, within which the film strip feeding mechanism is contained. The camera traversing screw 102 and the camera control rod 104 extend longitudinally through this housing. Adjacent and parallel to the camera traversing screw, the camera guide rail 200 extends across the machine. Guide rollers 202, rotatably carried on the top of the camera, bear against the front and rear of the guide rail (see Fig. 12) to prevent the camera moving toward or away from the counter board during transverse movement. A block 204, internally threaded to fit over the screw 102, is secured to the top of the camera by the screws 206, whereby rotation of the screw backward or forward moves the camera one or the other direction across the counter board.

In order to compel movement of the film strip 112 across the exposure openings 111 at a speed corresponding substantially to the speed with which the camera traverses the counter board 86, the feed roll 120 is positively driven by a rack and gear movement. The rack 208 is carried on the rail 200. A gear 210, having a pitch diameter equal to the outer diameter of the feed roll 120, is rotatably supported at the bottom in the top of the camera frame 148, and at the top in a bearing bushing 212 held in the housing cover 214, see Figs. 13 to 16.

It is desirable for reasons hereinafter explained that the feed roll 120 will be rotated only when the camera is traversing the counter board in the one direction, but will remain non-rotative when the camera is traversing the counter board in the other direction. To effectuate this end, the rack gear 210 contains within its relatively large bore a unidirectional clutch 215. This clutch is shown in horizontal section in Fig. 15, and is of conventional roller clutch design having rollers 217 and springs 218.

A second gear 216 (see Fig. 16) is axially spaced from the clutch 215 by a washer 219, the gears 210, 216 and washer 219 all being concentrically supported on the flanged sleeve 220 and held thereon by the nut 222. A pin 224 drivably connects the several parts through which it passes. The flanged member 220 is provided with an interiorly formed key part 226, which fits slidably into a key-way 228 in the drive spindle 230. A spring 232 bears against a shoulder on the spindle and forces it downwardly until a pin 234 bears against the top of the flanged member 220. A flattened driving tang 236 extends into a corresponding socket 237 in the upper end of the journal 239 of the feed roll 120. A groove 238 is provided in the upper end of the spindle 230, whereby it may be lifted against the stress of the spring 232, when it is desired to remove the magazines together with its feed roll.

The film strip take-up spool 118, upon which the film strip is wound after exposure, is driven by a mechanism Fig. 17, considerably like the feed roll mechanism Fig. 16, in that it employs the same spindle 230, tang 236, spring 232, key-way 228, key 226, bearing 212, pin 234, nut 222, groove 238 and journal 239. The key 226, however, is carried by a flanged member 240 within pockets of which are a series of springs 242. A friction disk 244 rotates in unison with the flange member 240, and is urged upwardly by the springs against a friction washer 246.

The gear 248, which has a friction disk 250 secured thereto, is rotatable about the hub of the member 240 freely, except in so far as it is driven in unison with said hub by friction between the disk 250 and the washer 246. The gear 248, therefore, drives the film strip take-up spool 118 in unison with itself except when the film strip is not fed to the spool fast enough, in which case slippage of the friction parts permits the spool rotatively to lag behind the gears. The gear 248 is driven by the gear 216 through the idler gears 252, 254, 256, all rotatable on non-rotatable studs held in the camera frame 148 and cover 214. Gear 248 therefore rotates as much faster than gear 210 as the inverse ratio of their respective number of teeth. Gear 248 is made sufficiently smaller than gear 210 to insure that the film strip take-up spool 118 will always lag slightly behind its driving gear 248. An idler roll 258 (see Fig. 8) keeps the film strip in its proper position at the end of the light tunnels 110.

The magazine proper, which has been generally designated by the numeral 114, is shown in Figs. 20 to 24 inclusive, and comprises a vertical plate 260 having a top head 262 and a bottom head 264 extending laterally therefrom. A double walled partition 266 extends at right angles from the vertical plate. This double walled partition is divided by small plates 268, whereby there is provided the light tunnels 110, corresponding in number to the number of lenses 88 in the camera.

The feed roll 120 and idler roll 258 are rotatably supported in bearings in the top and bottom heads 262 and 264. The supply spool 116 and the take-up spool 118 have rotative bearing in the bottom head 264, but in the top head their journals 239 are supported in U-shaped slots 267, whereby the spools 116 and 118 may have their axes leaned outwardly to permit the spools to be entered or removed from the magazine.

The film strip 112 comprises a leader strip 270, a first sensitized portion 272, a second sensitized portion 274 and a trailer strip 276. The film strip is put on the spools by inserting the ends 278 and 280 in slits 282 in the take-up spool 118 and supply spool 116, and turning the spool until the strip is taut.

The magazine cover 136 fits over and closes the magazine after the film strip 112 (see Fig. 19) has been put on the spools 116 and 118 and the spools put in their bearings. Round openings in the top of the covers slip over the journals 239 of the feed roll and the spools and hold the spool journals in the bottom of the U-shaped slots 261. When the magazine, the film strip and the cover are thus assembled, the openings 164 and 166, as well as the openings 168 and 170, in the film strip are in alignment with the contact members 128 and 130, or may be brought thereunder by movement of the strip from one spool to another. A stud 284 extends upwardly from the magazine top 262 through a small hub 286 on the cover 136. A cross hole 288 extends through both stud 284 and hub 286, and a wire 290 extends through the cross hole and is held clamped in a lead seal 292, whereby the cover 136 may not be removed without breaking the seal 292.

The coarse pitch screw 102, which causes transverse movement of the camera 84, is rotatable at the left end of the machine in a bearing 294, Fig. 27, secured to a bearing plate 296 by screws 298. The bearing plate is secured to the machine by screws 300. A bracket 302 is secured to the bearing plate by screw 304. The control rod 104 has axial sliding movement in bracket 302.

At the right hand end the screw 102 is rotatable in a bearing 306 secured to a bearing plate 308 (see Fig. 30) by screws 310. The bearing plate 308 is in turn secured to the machine by bolts 312.

Figure 31:
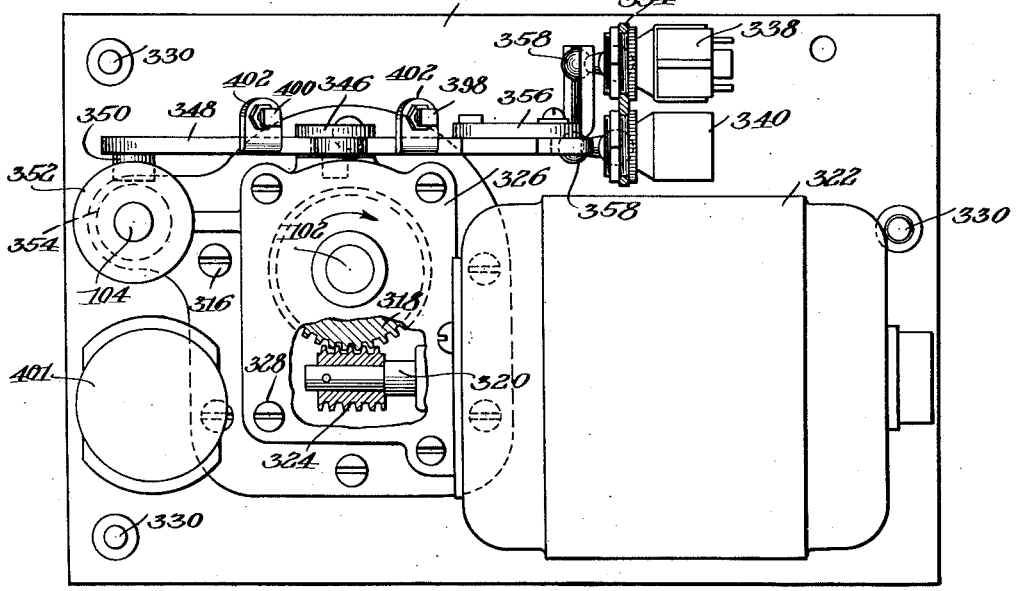
Fig. 31 is an end view of Fig. 30.

A worm gear housing 314 is secured to the bearing plate 308 by screws 316. The end of the screw 102 extends into this housing and a worm wheel 318 is affixed to the end thereof (see Fig. 31). The shaft 320 of a series wound electric motor 322 has secured to the end thereof a worm 324. The teeth of the worm 324 and of the worm wheel 318 are in constant mesh. A worm housing cover 326 is held to the housing 314 by the screws 328. A variable resistance element 323 is placed in series with the motor circuit whereby the speed of the motor may be altered if it is desired to alter the exposure period of the film strip.

Spaced apart from the bearing plate 308 by the rods 330 (see Figs. 30 and 31) is a second plate 332. A cross member 334 is secured to the plate 308 by the screws 336, the other end of the cross member being anchored by extending into a lot in the plate 332. A conventional double pole tumbler switch 338, for reversing the motor by changing the direction of current flow in one of its elements as in common practice, and a conventional single pole tumbler switch 340, for controlling the circuit through the series bank of lamps 106, are mounted on the cross member 334. A bracket 342 extending laterally inward from the plate 332 (see Fig. 33) carries a third single pole tumbler switch 344, which is the main line switch and, when open, severs all electrical connections.

A stud 346 extending into the top of the worm gear housing 314 pivotally supports the switch operating lever 348. The forward end of lever 348 has a stud 350 extending downwardly into the space between the flanges 352 of a hub 354 secured to the end of the rod 104.

The rearward end of the lever 348 carries the switch operating lugs 356, between which the switch tumblers 358 extend. A collar 360 secured to the rod 104 (see Fig. 27) and a collar 362 cushioned by spring 363 against a collar 365 secured to the rod 104 (see Fig. 28), are engaged by the camera 84 in its transverse movement, whereby the rod is moved axially one or the other direction to operate the switches 338 and 340 to their two positions. The spring 363 cushions the camera movement.

Supported in the end plate 332 is a conventional cylinder lock 364, to the inner end of the barrel of which is secured the switch operating cam 366. The turning of the key 368, therefore, operates the cam through a limited rotative movement. A stud 370 extends laterally from the cam 366. A similar stud 372 extends laterally from the plate 332. A spring 374, tensioned by having one end secured to stud 370 and the other end to stud 372, urges the cam rotatably in a direction which is counterclockwise when viewed from the right end.

On the face of the cam 366 adjacent the plate 332 are the latch lugs 376 and 378. Fexible latch members 380 and 382 are secured to the inside of the plate 332 by the screws 384. Members 380 and 382 carry latch lugs 386 and 388, respectively, which are adapted to engage respectively the lugs 376 and 378 at different periods in the operation of the camera. A notch 390 in the periphery of the cam 366 receives the tumbler 392 of the switch 344, whereby rotation of the cam 366 to different positions operates the switch to its "on" and "off" positions.

The upper ends of the latch members 380 and 382 are extended laterally and downwardly (see Figs. 33 and 36), the downwardly extending ends 394 and 396 being adapted to be engaged by the two adjustable screws 398 and 400, held in lugs 402 which extend upwardly from the lever 348, whereby movement of the lever by the rod 104 in one or the other direction also flexes the latch members 380 and 382, thereby operating their lugs 386 and 388 with respect to the cam latch lugs 376 and 378.

The cover 403 extends over the outer plate 332 to and over the inner plate 308, thereby enclosing the motor and switch operating elements. Small holes 407 (see Fig. 30) extend through the outer ends of the rods 330. The outer ends of the rods are threaded for the knurled nuts 405. The wire of a lead seal 409 (see Fig. 26) passes through the small hole 407 and prevents unauthorized removal of the cover 403.

A lamp 401 is connected in series with the bank of lamps 106. This lamp when lit is visible through an opening 399 (see Fig. 32). This gives an indication, when the switch board is closed and a photographic record is being made, that the bank of lamps 106 is lit.

When the voting release key 78 at the left of the machine is turned to make the voting board available to the voter, and the locking bar 76 is thereby raised to interlock with the upper door bolt 62, thereby to prevent access to the counter board as hereinbefore explained, the locking bar 76 draws upwardly with it an interlock bar 404. The interlock bar 404 near its lower end has a latch lug 406. Figs. 38, 41 and 42 all show the interlock bar 404 in the raised position.

The latch bar 408 is pivotally supported on the machine at 410 and is joined by a link to an electromagnetic element 414. A tension spring 416 normally draws the latch bar 408 toward the left.

At 418 the latch bar 408 extends horizontally for a short distance, then again vertically (see Fig. 37 and Fig. 38). At the extreme upper end a pin 420 extends laterally. A release latch 422 is hinged to the frame at 424. A hook 426 on the latch 422 is drawn downward by the spring 428, whereby it drops over the pin 420 when the locking bar 408 is in the position shown in Fig. 41. The hook 426 may, however, be raised from the pin 420 by downward pressure on the trip end 430, whereby the locking bar will be drawn by the spring 416 from the position shown in Fig. 41 to the position shown in Fig. 42, provided, of course, that the interlock bar 404 has been raised to the position shown in Figs. 41 and 42 by turning the voting release key 78, and thereby making the voting board available to the voter. In operation, a cam block 431 secured to the bottom of the camera is caused by camera movement to pass over and depress the trip end 430.

As long as the locking or latch bar 408 remains in the position shown in Fig. 42, its horizontally disposed portion 418 hooks under the latch lug 406, whereby the voting release key may not be turned and, therefore, the locking bar 76 may not be withdrawn to permit opening of the doors which give access to the counter board.

When it becomes desirable to return again the latch bar 408 to the position shown in Fig. 41, it is done electrically, that is, by energizing the electromagnetic element 414, which is done by completing an electrical circuit through contact members 128 and 130, when the holes 164 and 170 allow said contact members to extend therethrough. A signal lamp 415 is connected in parallel with the electromagnetic element 414. Lamp 415 is visible through an opening 417 in the machine frame, and thereby indicates when the contacts 128 and 130 have extended through the openings in the film strip 112.

As an added precaution against tampering and as a means to prevent human contact with any of the electrified elements, two conventional switches 432, operable to break the circuit by the movement of the counter cover 54 in opening, are provided. They are shown in Figs. 37 and 38, and to an enlarged scale in Figs. 39 and 40. A pin 434, having flanges 436 which straddle the tumbler 438, is pressed by the cover 54, against the resistance of the spring 440, to close the circuit when the door is closed. Fig. 39 shows the condition of the switch when the door is open, and Fig. 40 shows it when the door is closed.

The circuit diagrams, Figs. 43 to 49, are given numerals to correspond in so far as possible to the operative elements of the structure and are used in describing the operation of the mechanism, which is as follows:

Magazine cover 136, Fig. 23, is removed from magazine 114, Fig. 3. A specially prepared daylight loading cartridge is placed in position on the spool 116, Figs. 21 and 8. The leader strip is drawn out under guide roller 124, Fig. 8, over feed roll 126, Fig. 8, over exposure opening 111, over idler 258, and started onto the take-up spool 118. Spool 118 is turned only sufficiently to allow the leader strip to be firmly engaged on the spool 118. Cover 136, Fig. 23, is then placed on the magazine 114, Fig. 24, and a seal 292 is put in place as shown in Fig. 20. The magazine is then placed in the voting machine as in Fig. 3 and Fig. 8. Film spool 116 is then turned by attaching a special key (not shown) to the spindle 230, Fig. 18, which passes through the camera mechanism Fig. 17, engaging the take-up spool 118 through the U-shaped slot 267, Fig. 21. The film is then wound in a clockwise direction until the openings 164 and 166 in the film strip 112 (see Fig. 19) uncover the contacts 128 and 130, Fig. 9. These contacts complete the circuit as in Fig. 43, whereby there will be current flowing through the contacts 128 and 130, Fig. 9, through the winding of the electromagnet 414, Figs. 41 and 42, and through the signal lamp 415, Fig. 3.

Fig. 44 shows the film strip 112 before the holes 164 and 166 have reached the contact members 128 and 130. Fig. 45 shows the film strip 112 when the contact members are reaching through the holes 164 and 166 of the film strip. Fig. 47 shows the film strip after the holes 164 and 166 have passed by the contact members.

The positioning of the film strip, as in Fig. 46, cuts off the current from the winding of the electromagnet 414 (see Figs. 41 and 46), as well as the signal lamp 415, Fig. 3. But while current is now cut off from the electromagnet 414, the hook 426, being caught over the pin 420, maintains the latch bar 408 in the position shown in Fig. 41, in which position it remains until tripped by mechanical pressure which will later be applied to the trip end 430, when travel of the camera toward the left moves the cam block 431 over the said trip end.

The counter board cover 54 may, if desired, be closed at this time, or its closing may, if desired, be deferred until the camera has traversed the counter board once left and once right, thereby completing the first exposure. In either event the closing of the cover 54 closes the safety switches 432 (see Figs. 37 to 40). The upper door 52, Fig. 1, may now be closed and bolted by means of the knob 60 and locked with the key 72, Fig. 1. The key 78 may be turned to the position shown in Fig. 41 to interlock the parts 74 and 76 and to raise the latch 406 at this time, or it may be deferred until after the taking of the first exposure. In either event the key 368, Fig. 3, is now operated by turning it in a clockwise direction against the resistance of the extension spring 374, from a position as indicated in Fig. 32 to a position as indicated in Fig. 34, which is the limiting point of its rotation. When brought to the position indicated in Fig. 34, it will be, for the time being, held by engagement of the catch 376 with the catch 386. In turning the key from the position shown in Fig. 32, to that shown in Fig. 34, the line switch 344 has been operated from open to closed position. The closing of the line switch 344 completes a circuit, as shown in Fig. 47, wherein the motor reversing switch 338 is set to traverse the motor in a direction which moves the camera 84 to the left across the face of the counter board. Since no exposure is made while the camera travels toward the left, the lighting switch 340 is now in the "off" position.

The camera will continue to move in this direction until it reaches the extreme left hand position of its travel, at which time it moves the cam lug 431 upon the trip end 430, thereby releasing the hook 426 from the pin 420, whereupon the spring 416 draws the latch bar 408 toward the left. If the voting release key 78 has already been turned at this time to interlock the parts 74 and 76 and to raise the catch 406, the part 418 will be drawn toward the left and under the catch 406, as shown in Fig. 42. If, however, the turning of the key 78 is being delayed until the first exposure is completed, the part 418 merely rests against the catch 406 until the catch is afterward raised by the key 78, whereupon the part 418 will drop under the catch 406 at that time.

When the part 408 has once dropped under the catch 406, the key 78 may not be turned to undo the interlock at 74 and 76, whereby the door 52 and counter board cover 54 may not be opened except by passing current through the winding of the electromagnet 414, thereby to reset the latch bar 408, as in Fig. 41.

That no such electrical connection may be made with the mechanism except by making both film strip exposures will later appear.

At substantially the same time that the cam lug 431 is pressed upon the trip end 430, the camera engages the collar 360, which moves the rod 104, causing the lever 348 to operate the switch 338, to reverse the motor and to operate the switch 340 to turn on the bank of lamps 106 and pilot lamp 401 for film strip exposure. The same movement of the lever 348 causes the screw 398 to depress the part 394, which releases the catches 376 and 386, and thereby permits the spring 374 to rotate the key 368 slightly counter-clockwise, although not far enough to throw the line switch 344 to the "off" position, the action of the spring 374 being arrested by reason of the latch 378 catching on the latch 388.

During travel to the left, no part of the film strip 112 was taken by the feed roll 120 off the spool 116, because of the fact that the unidirectional clutch 215 is inoperative to turn the feed roll when the gear 210 rotates in a direction caused by left hand movement of the camera. But now that camera movement toward the right has begun, the film strip is drawn from the spool 116 and transferred to the spool 118. The bank of lamps 106 being lit at this time, the exposure of the first part of the film strip begins. At this time the electric circuit will be as represented in Fig. 48.

The camera will now travel toward the right to the right hand limit of its movement, that is, to the position shown in dotted lines at 84, Fig. 1. The last portion of the movement of the camera to this position automatically moves the control rod 104 to the right by engagement with the mechanism represented by the parts 362, 363 and 365, whereby the lever 348 operates the motor switch 338 to a position for again reversing the direction of rotation of the motor, and operates the lighting switch 340 to the "off" position, which extinguishes the bank of lamps 106 and pilot lamp 401.

This same movement of the lever 348 also causes the screw 400 to depress the part 396, whereby the catch 388 releases the catch 378 and permits the spring 374 to complete the return of the cam 366 and key 368 to its starting position, which also throws the tumbler 392 of the line switch 344 to the "off" position, in which position the key 368 may be removed from the lock and carried by the proper official during the voting period. The circuit is now as represented in Fig. 47, wherein the bank of lamps 106 and the pilot lamp 401 are extinguished and the contact members 128 and 130 are insulated by the film strip 112, by reason of the fact that the middle portion of the strip which is now over the contact members is not provided with openings through which the contact members may extend.

It will be recalled that the latch bar 408 has previously been released and drawn toward the left by the spring 416, and that if the key 78 has already been turned so the catch 406 will be in the raised position, the part 418 will now be under the catch 406, as in Fig. 42, but that if the key 78 has not yet been turned to raise the catch 406, the part 418 will be resiliently held against the face of the catch 406, and will be drawn thereunder as soon as the catch is raised. It follows that if the key 78 has not up to this time been turned, it should be so turned at this time, whereby the machine will be unlocked for voting, the counter board cover will be locked against tampering, and the interlock mechanism 74, 76 may not be undone to prevent access to the camera and counter board except by energization of the electromagnet 414, which may not now be effected except by completing a second exposure of the film strip 112, and thereby bringing the openings 168 and 170, Fig. 19, over the contact members 128 and 130, Fig. 9.

After the voting period has been completed, the proper official again inserts and turns the key 368, whereupon the mechanism causes a second picture taking cycle to take place exactly like the first except that the second sensitized part 274 of the film strip is exposed at this time instead of the first part 272. When the camera reaches the end of the second picture taking cycle, the contacts 128 and 130 will be again uncovered, this time by the openings 168 and 170, in the film strip 112. The circuit will now be as represented in Fig. 49, whereby the electromagnet 414 is energized, the latch bar 408 is drawn thereby to the position shown in Fig. 41. This will allow the interlock bar 404 to be moved in a downward direction by the key 78, which will lock the machine against voting and permit the camera compartment to be opened so that the magazine can be removed. Before the magazine is removed, however, the film is further wound on spool 118 until all the film including the trailer, part 276, has been completely transferred. At this time the openings in the film strip, Fig. 19, will have passed the contacts 128 and 130, thus opening the circuit through the electromagnet 414. The magazine can now be removed from the voting machine camera, whereupon the circuit will again be as represented in Fig. 43.

Although I have shown but one embodiment of means for practising my invention, it is pointed out that the invention may be practised by many radically different mechanisms and that the same is not dependent upon any particular mechanism.

While I have shown in great detail parts of a voting machine, it is to be understood that my invention may be practised with other types of apparatus, as, for example, in connection with meter and like readings and the production of photographic records thereof. In the patent to William H. Petit and myself, No. 1,963,312, June 19, 1934, is disclosed another type of apparatus in connection with which my invention may be practised.

As hereinbefore pointed out, a sensitized film strip of the type shown in Patent No. 1,963,096 to William H. Petit and myself, is an important feature of the mechanism or organization preferably employed by me in the practice of my invention, in that the said strip has one or more structural variations whereby certain functions of the mechanism are controlled. The said strip, whether it is acting as an insulating means or otherwise controlling an electric circuit, cooperates in the carrying out of my invention and constitutes a portion of the means by which that invention is preferably carried out.

Throughout the specification, I have used such terms as "interlocking means" and "interlocking mechanism." I desire it to be understood that the same are used in a broad and generic sense and that any suitable interengaging means may be employed, provided the same is or may be used in carrying out the purposes of my invention. I also point out that although I have specifically referred to an enclosure for the counting mechanism or registering mechanism, the term "enclosure" is of broad significance and that any suitable barrier may be provided which is positioned or rendered effective through the act of making the first photographic record and is released through the act of completing the second photographic record.

From the foregoing description of the operation of the mechanism which is selected as a single embodiment of the mechanism by which my invention may be practised, it will be evident that no tampering with the camera or with the counter board may be done between the time that the camera takes one picture of the counter board until after it has completed a second picture, the time interval being the time within which the machine is unlocked and made accessible for voting.

However, the provisions of means to prevent tampering with the taking of two pictures, one before and one after voting, is fully claimed in my Patent No. 2,136,262, dated November 8, 1938, and although I have shown substantially such means in the present application, it is by way of example only, and the claims of this application are not directed to such features, but are directed to improved traversing mechanism for moving a camera across an object surface, whether the latter be a voting machine or something else that is to be photographed.

In the patent to Petit and Hineline No. 1,977,453, traversing means is disclosed, and broadly and generically claimed with respect to what is disclosed in this application, but in that patent the electric motor is traversed with the camera. In the improved mechanism herein disclosed and herein claimed, the electric motor is mounted upon the stationary part of the mechanism or apparatus, and acts through the screw 102, the control rod 104 and cooperating means, to traverse the camera to and fro across the face of the object to be photographed.

It will be clear from the foregoing description that the motivating mechanism is not carried by the camera but is or may be relatively remote therefrom, being upon a stationary part of the apparatus. This makes readily possible the operation of the camera, even though the latter is sealed in a separate compartment. There is, therefore, herein disclosed for the first time, and there is herein claimed, mechanism to traverse a photographic camera across a nearby surface to be photographed and to be returned to the starting position in which it is then locked, the control for such movement of the camera being located relatively remote from the camera itself, so that the latter may, if desired, be in a sealed enclosure and control of the camera taking place from outside such enclosure.

Having thus described one illustrative embodiment of my invention and the best mode known to me for practising the same, it is to be understood that although specific terms are employed, they are used in a generic and descriptive sense and not for purposes of limitation, the scope of the invention being set forth in the following claims.

I claim:

1. Photographic mechanism comprising, in combination, a photographic apparatus having lens means, means to support said photographic apparatus for traversing movement in a path in substantial proximity to a large object-surface, means stationarily mounted upon such support and operatively connected to said photographic apparatus to traverse said apparatus in said path across said object-surface, said lens means being so positioned and related to the object-surface as to photograph the entire object-surface during a single traversing movement of the photographic apparatus in said path, and means to support a sensitized member upon said photographic apparatus, so that it may be exposed to the object-surface throughout said traversing movement in one direction.

2. Photographic mechanism comprising, in combination, a photographic apparatus having lens means, means to support said photographic apparatus for traversing movement in a path in substantial proximity to a large object-surface for photographing the latter, an electric motor stationarily mounted upon such support and having driving connections to the said photographic apparatus to cause the traversing of said photographing apparatus in said path across said object-surface, said lens means being so positioned and related to the object-surface as to photograph the entire object-surface during a single traversing movement of the photographic apparatus in said path, and means to support a sensitive member upon said photographic apparatus, so as to be exposed to the object-surface throughout the traversing movement in one direction.

3. Photographic mechanism comprising, in combination, a camera, a movable carriage whereon the same is mounted, a stationary support for said carriage and whereon the said carriage may be traversed in substantial proximity to a large object-surface for photographing the latter, a motor stationarily mounted upon said support, a camera traversing screw mounted upon said support and having means whereby said screw is rotated from said motor, and a threaded member on said camera carriage in meshing relation with said camera traversing screw, whereby said carriage and camera are traversed.

4. Photographic mechanism comprising in combination, a camera, a movable carriage whereon the same is mounted, a stationary support for said carriage and whereon the said carriage may be traversed in substantial proximity to a large object-surface for photographing the latter, an electric motor stationarily mounted upon said support, a camera traversing screw upon said support adapted to be rotated by said electric motor, an interiorly threaded block upon the carriage receiving said screw, whereby the carriage is traversed, and means for reversing the direction of travel of said carriage when the same has reached its limit of travel in one direction.

5. Photographic mechanism comprising, in combination, a camera, a movable carriage whereon the same is mounted, a stationary support for said carriage and whereon the said carriage may be traversed in substantial proximity to a large object-surface for photographing the latter, a motor stationarily mounted upon said support, a camera traversing screw mounted in bearings on said support and rotated from said motor, and a camera control member mounted upon said support and having means to co-act with the camera carriage for changing the direction of movement of the latter.

6. Photographic mechanism comprising in combination, a camera, a movable carriage whereon the same is mounted, a stationary support for said carriage and whereon the said carriage may be traversed in substantial proximity to a large object-surface for photographing the latter, a motor stationarily mounted upon said support, a camera traversing screw mounted in bearings on said support and rotated from said motor, and a camera control rod 104 mounted for axial sliding movement upon said support and having means for engaging said camera carriage to reverse the direction of movement thereof.

7. Photographic mechanism comprising in combination, a camera, a movable carriage whereon the same is mounted, a stationary support for said carriage and whereon the said carriage may be traversed in substantial proximity to a large object-surface for photographing the latter, a motor stationarily mounted upon said support, a camera traversing screw mounted in bearings on said support and rotated from said motor, camera control means mounted upon said support and adapted to engage said camera carriage to change the direction of movement of the latter, and lighting means carried by and traveling with said carriage for the purpose of lighting the object-surface during one direction of traverse of the said camera carriage.

8. Photographic mechanism comprising in combination, a camera, a movable carriage whereon the same is mounted, a stationary support for said carriage, and whereon it may be traversed in substantial proximity to a large object-surface for photographing the latter, an electric motor stationarily mounted upon said support, a camera traversing screw 102 mounted in bearings on said support and driven by said motor, an internally threaded block 204 upon the camera carriage to receive said screw, whereby the carriage is traversed, and camera control means for reversing the direction of travel of said camera carriage.

9. Photographic mechanism comprising in combination, a camera, a movable carriage whereon the same is mounted, a stationary support for said carriage, and whereon it may be traversed in substantial proximity to a large object-surface for photographing the latter, an electric motor stationarily mounted upon said support, a camera traversing screw 102 mounted in bearings on said support and driven by said motor, an internally threaded block 204 upon the camera carriage to receive said screw, whereby the carriage is traversed, camera control means for reversing the direction of travel of said camera carriage, and an electric circuit including a switch for reversing the motor.

10. Photographic mechanism comprising in combination, a camera, a movable carriage whereon the same is mounted, a stationary support for said carriage, and whereon it may be traversed in substantial proximity to a large object-surface for photographing the latter, an electric motor stationarily mounted upon said support, a camera traversing screw 102 mounted in bearings on said support and driven by said motor, an internally threaded block 204 upon the camera carriage to receive said screw, whereby the carriage is traversed, camera control means for reversing the direction of travel of said camera carriage, electric lighting means upon said camera carriage, an electric circuit including said motor and said lighting means, and also including a switch 338 for reversing the motor, and a switch 340 for controlling said lighting means.

11. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw 102 mounted in bearings on said support and driven by said motor, an internally threaded block 204 upon the camera carriage to receive said screw, whereby the carriage is traversed, camera control means for reversing the direction of travel of said camera carriage, lighting means upon said camera carriage, an electric circuit including said motor and lighting means, a main line switch 344, switch 338 for reversing the motor, switch 340 for controlling the lighting means, and switch operating means operatively connected to said camera control means.

12. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw 102 mounted in bearings on said support and driven by said motor, an internally threaded block 204 upon the camera carriage to receive said screw, whereby the carriage is traversed, camera control means for reversing the direction of travel of said camera carriage, lighting means upon said camera carriage, an electric circuit including said motor and lighting means, a main line switch 344, switch 338 for reversing the motor, switch 340 for controlling the lighting means, and a switch operating lever connected to the camera control means whereby said lever is operated at the end of a traversing movement of the camera carriage.

13. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw mounted on said support and driven by said motor, a threaded member on said camera carriage to receive said screw whereby said carriage is traversed, camera control means carried by said support for reversing the direction of travel of the camera carriage, lighting means on said carriage, an electric circuit including said lighting means and said motor, a member operatively connected to said camera control means and moved thereby, and switches controlled by said member for reversing the motor and controlling said lighting means.

14. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw mounted on said support and driven by said motor, a threaded member on said camera carriage to receive said screw whereby said carriage is traversed, camera control means carried by said support for reversing the direction of travel of the camera carriage, electric lights 106 upon the camera carriage for lighting the object-surface, a light 401 also upon said carriage to indicate when a photograph is being made, an electric circuit including said lights 106 and 401 and said motor, a switch for reversing the motor, a switch for said lamps, a switch operating lever 348, and operative connections between said lever and the camera control means.

15. Photographic mechanism comprising in combination, a camera, a movable carriage whereon the same is mounted, a stationary support for said carriage, and whereon it may be traversed in substantial proximity to a large object-surface for photographing the latter, an electric motor stationarily mounted upon said support, a camera traversing member mounted on said support and driven by said motor, cooperating means on the carriage whereby the latter is traversed by said member, an electric circuit including said motor, a switch operating cam 366 and switches located in and controlling said circuit and controlled by said cam.

16. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing member mounted on said support and driven by said motor, cooperating means on the carriage whereby the latter is traversed by said member, an electric circuit including said motor, a switch operating cam 366 and switches located in and controlling said circuit and controlled by said cam, said switch operating cam 366 being adapted to receive a removable controlling key.

17. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing member mounted on said support and driven by said motor, cooperating means on the carriage whereby the latter is traversed by said member, an electric circuit including said motor, lighting means in said circuit, switches in said circuit controlling said motor and said lighting means, a switch operating cam 366, and latch members 380 and 382 controlled and positioned thereby, and cooperating with said switches in said circuit.

18. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing member mounted on said support and driven by said motor, cooperating means on the carriage whereby the latter is traversed by said member, an electric circuit including said motor, lighting means in said circuit, switches in said circuit controlling said motor and said lighting means, a switch operating cam 366, and latch members 380 and 382 controlled and positioned thereby, and cooperating with switches in said circuit, and means upon the support for engaging the camera carriage to reverse the direction of movement thereof and including rod 104, lever 348 operated by said rod, and said latch members 380 and 382 operated by said lever 348.

19. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a worm carried by said electric motor, a camera traversing screw, rotated by said worm, a threaded member upon the camera carriage engaging said screw for traversing the carriage, a camera control rod 104 upon the support provided with collars at opposite end portions thereof positioned so as to be respectively engaged by the camera carriage at opposite ends of the traversing movement thereof for changing the direction of movement.

20. Photographic mechanism comprising in combination, a camera, a movable carriage whereon the same is mounted, a stationary support for said carriage, and whereon it may be traversed in substantial proximity to a large object-surface for photographing the latter, an electric motor stationarily mounted upon said support, a camera traversing screw upon said support, driven by said motor, and functioning to traverse said carriage, and camera control means upon the support and having spaced formations which are respectively engaged by the camera carriage at opposite ends of its movement for changing its direction of movement.

21. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw upon said support driven by said motor and functioning to traverse said carriage, camera control means upon the support and having spaced formations which are respectively engaged by the camera carriage at opposite ends of its movement for changing its direction of movement, an electric circuit including said motor, lighting means upon said camera carriage and also in said circuit, and switching means located in said circuit and controlling said lighting means, and adapted to be operated by said camera control means.

22. Photographic mechanism comprising in combination, a camera, a movable carriage whereon the same is mounted, a stationary support for said carriage and whereon it may be traversed in substantial proximity to a large object-surface for photographing the latter, an electric motor stationarily mounted upon said support, a camera traversing screw 102 mounted on said support, driven by said motor, and engaging the camera carriage to traverse the latter, a camera control rod 104 having at opposite end portions thereof collars 360 and 364 to be engaged by the camera carriage, lighting means upon said camera carriage, an electric circuit including said motor and said lighting means, and switches in said circuit controlled through the said camera control rod 104.

23. Photographic mechanism comprising in combination, a camera adapted to be sealed or locked against access while a photograph is being taken thereby, a movable carriage whereon said camera is mounted, a stationary support for said carriage, and whereon said camera while in a sealed or locked position may be traversed with said carriage for photographic purposes in substantial proximity to a large object-surface, and means stationarily mounted upon the said support and relatively remote from the camera for traversing said camera carriage for photographing said object-surface while said camera is sealed or locked, and driving connections between the said camera carriage and said traversing means.

24. Photographic mechanism comprising in combination, a camera adapted to be sealed or locked against access while a photograph is being taken thereby, a movable carriage whereon said camera is mounted, a stationary support for said carriage and whereon said camera while in a sealed or locked position may be traversed with said carriage for photographic purposes in substantial proximity to a large object-surface, and means stationarily mounted upon the said support and relatively remote from the camera for traversing said camera carriage for photographing said object-surface while said camera is sealed or locked, driving connections between the said camera carriage and said traversing means, and camera control means carried by said support and having formations near opposite ends thereof to be engaged by the camera carriage when the latter approaches the ends of its traverse, thereby to change the direction of the traverse.

EDSON S. HINELINE.